(12) United States Patent
Ohnuki

(10) Patent No.: US 9,071,070 B2
(45) Date of Patent: Jun. 30, 2015

(54) CHARGE CONTROLLER AND CHARGING SYSTEM

(75) Inventor: Yasumichi Ohnuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 13/820,397

(22) PCT Filed: Jul. 29, 2011

(86) PCT No.: PCT/JP2011/067446
§ 371 (c)(1),
(2), (4) Date: Mar. 1, 2013

(87) PCT Pub. No.: WO2012/029479
PCT Pub. Date: Mar. 8, 2012

(65) Prior Publication Data
US 2013/0162208 A1    Jun. 27, 2013

(30) Foreign Application Priority Data

Sep. 3, 2010   (JP) .................................. 2010-198022
Dec. 14, 2010  (JP) .................................. 2010-277990

(51) Int. Cl.
*H02J 7/00*   (2006.01)
*H02J 7/14*   (2006.01)
(Continued)

(52) U.S. Cl.
CPC ............. *H02J 7/007* (2013.01); *B60L 11/1803* (2013.01); *B60L 11/1816* (2013.01);
(Continued)

(58) Field of Classification Search
CPC ............. B60L 11/182; B60L 11/1838; B60L 11/1818; B60L 11/1846; B60L 11/1862; B60L 11/18; B60L 3/00; H02J 7/00; H02J 7/02; H02J 7/0047; H02J 7/007
USPC ............................. 320/104, 109, 134; 701/22
See application file for complete search history.

(56) References Cited

U.S. PATENT DOCUMENTS 5,880,574 A * 3/1999 Otsuka et al. ................. 318/811
6,430,102 B2 * 8/2002 Mori et al. ..................... 365/226
(Continued)

FOREIGN PATENT DOCUMENTS

CN     116784 A    2/1996
CN    1116784 A    2/1996
(Continued)

OTHER PUBLICATIONS

Chinese Office Action application No. 201180041536.2 issued on Sep. 10, 2014.
(Continued)

*Primary Examiner* — M'Baye Diao
(74) *Attorney, Agent, or Firm* — Squire Patton Boggs (US) LLP

(57) ABSTRACT

A charge controller for controlling the charging of a battery provided inside a vehicle using a control signal supplied from an external power source apparatus via a power cable includes a control section for controlling the charging of the battery and an activating section for activating the control section inside the vehicle. The external power source apparatus switches the control signal from a non-oscillation state to an oscillation state when the preparation for power supply is completed. The activating section has an oscillation state judgment section for judging whether the input control signal is in the oscillation state or the non-oscillation state and for outputting an oscillation state judgment signal and an activating signal generation section for generating an activating signal for activating the control section when the oscillation state judgment signal is switched from a state indicating non-oscillation to a state indicating oscillation.

10 Claims, 22 Drawing Sheets

(51) Int. Cl.
*B60L 11/00* (2006.01)
*B60L 11/18* (2006.01)
*B60L 3/00* (2006.01)
*B60L 3/04* (2006.01)
*B60L 11/12* (2006.01)
*B60L 11/14* (2006.01)

(52) U.S. Cl.
CPC .......... *B60L 11/184* (2013.01); *B60L 2210/30* (2013.01); *Y02T 10/7005* (2013.01); *Y02T 10/7088* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01); *H01M 2220/20* (2013.01); *B60L 3/0069* (2013.01); *B60L 3/04* (2013.01); *B60L 11/123* (2013.01); *B60L 11/14* (2013.01); *B60L 11/1818* (2013.01); *B60L 11/1825* (2013.01); *B60L 11/1846* (2013.01); *B60L 2210/10* (2013.01); *B60L 2210/40* (2013.01); *B60L 2230/12* (2013.01); *Y02T 10/7077* (2013.01); *Y02T 10/7216* (2013.01); *Y02T 10/6217* (2013.01)

(56) References Cited

U.S. PATENT DOCUMENTS

| | | | |
|---|---|---|---|
| 6,879,888 B2 * | 4/2005 | Ochiai et al. | 701/22 |
| 8,536,833 B2 * | 9/2013 | Ohnuki | 320/119 |
| 2002/0001239 A1 * | 1/2002 | Mori et al. | 365/200 |
| 2009/0278600 A1 | 11/2009 | Ikeda | |
| 2010/0270860 A1 | 10/2010 | Kamaga | |
| 2010/0299008 A1 | 11/2010 | Mitsutani | |

FOREIGN PATENT DOCUMENTS

| | | |
|---|---|---|
| JP | 09-163616 A | 6/1997 |
| JP | 2009-171713 A | 7/2009 |
| JP | 2009-171733 A | 7/2009 |
| JP | 2009-296570 A | 12/2009 |
| JP | 2010-142087 A | 6/2010 |
| WO | 2009/034878 A1 | 3/2009 |

OTHER PUBLICATIONS

International Search Report, mailing date of Oct. 18, 2011.
IPER (II) dated Aug. 7, 2012.

\* cited by examiner

*FIG. 3*

| PREVIOUS STATE OF PILOT SIGNAL CPL | STATE OF PILOT SIGNAL CPL | PREVIOUS STATE OF ACTIVATING SIGNAL INT | STATE OF ACTIVATING SIGNAL INT |
|---|---|---|---|
| NON-OSCILLATION | NON-OSCILLATION | CLEAR | ← |
| NON-OSCILLATION | NON-OSCILLATION | SET | ← |
| NON-OSCILLATION | OSCILLATION | CLEAR | SET |
| NON-OSCILLATION | OSCILLATION | SET | ← |
| OSCILLATION | NON-OSCILLATION | CLEAR | ← |
| OSCILLATION | NON-OSCILLATION | SET | ← |
| OSCILLATION | OSCILLATION | CLEAR | ← |
| OSCILLATION | OSCILLATION | SET | ← |

COMPARISON RESULT

INTEGRATED VALUE

CHARGE CONTROLLER AND CHARGING SYSTEM

CROSS-REFERENCED TO RELATED APPLICATIONS

This application is a National Stage entry of International Application PCT/JP2011/067446 filed Jul. 29, 2011, which claims priority to Japanese Application Nos. 2010-198022, filed Sep. 3, 2010, and 2010-277990 filed Dec. 14, 2010, the disclosure of these prior applications are hereby incorporated in their entirety by reference.

TECHNICAL FIELD

The present invention relates to a charge controller and a charging system provided for a vehicle, such as a plug-in EV (Electrical Vehicle) or a plug-in HEV (Hybrid Electrical Vehicle) and capable of charging a battery from an external power source.

BACKGROUND ART

FIG. 22 is a view showing the schematic configuration of a part relating to the charging system of a plug-in hybrid vehicle disclosed in Patent Document 1. In the charging system shown in FIG. 22, in a vehicle whose electric storage device is charged with power from an external power source, a pilot signal CPLT from a control pilot circuit 334 inside a charging cable 300 is used as an activating signal for the charging system.

FIG. 23 is a view illustrating the charging system shown in FIG. 22 in more detail. In addition, FIG. 24 is an example of a timing chart of the pilot signal CPLT shown in FIGS. 22 and 23. As shown in FIG. 23, the control pilot circuit 334 inside the charging cable 300 has a voltage sensor 604 and an oscillator 602. The oscillator 602 is operated by the power supplied from a power source 402.

As shown in FIG. 24, the oscillator 602 outputs a non-oscillation signal when the voltage of the pilot signal CPLT detected by the voltage sensor 604 is close to a specified initial voltage V(1) (e.g., 12 V), and outputs a signal oscillating at a specified frequency (e.g., 1 kHz) and at a specified duty cycle when the voltage lowers to a specified oscillation voltage V(2) (e.g., 9 V) that is lower than V(1). Furthermore, the control pilot circuit 334 supplies a current to an electromagnetic coil 606 when the voltage of the pilot signal CPLT is close to a specified voltage V(3) (e.g., 6 V). When the current is supplied from the control pilot circuit 334, the electromagnetic coil 606 generates an electromagnetic force and turns on a relay 332.

The voltage of the pilot signal CPLT is adjusted by switching the resistance value of the resistance circuit 502 of an ECU 170. The ECU 170 includes the resistance circuit 502, input buffers 508 and 510, and a CPU (Control Processing Unit) 520. The resistance circuit 502 includes pull-down resistive elements R(2) and R(3) and switches SW(1) and SW(2). The CPU 520 includes a CPU 512 and a CPU 514.

The pull-down resistive element R(2) and the switch SW(1) are connected in series between a control pilot line L(1) to which the pilot signal CPLT is transmitted and a vehicle earth 518. The pull-down resistive element R(3) and the switch SW(2) are connected in series between the control pilot line L(1) and the vehicle earth 518 and further connected in parallel with the series-connected pull-down resistive element R(2) and switch SW(1).

The switch SW(1) is turned on/off by a control signal from the CPU 512. When the switch SW(1) is turned on, the pull-down resistive element R(2) and the vehicle earth 518 become a connection state. When the switch SW(1) is turned on, the pull-down resistive element R(2) and the vehicle earth 518 become a non-connection state. In a state in which charging is not performed, the switch SW(1) is off, and the pull-down resistive element R(2) and the vehicle earth 518 are in the non-connection state. In other words, when the charging cable 300 is connected to the vehicle, the switch SW(1) is off, and the pull-down resistive element R(2) and the vehicle earth 518 are in the non-connection state.

A power source 516 whose supply power is controlled by a control signal from the CPU 514 is connected to the switch SW(2). When power is supplied from the power source 516 to the switch SW(2) by the control signal from the CPU 514, the switch SW(2) is turned on, and the pull-down resistive element R(3) and the vehicle earth 518 become a connection state. When the power from the power source 516 to the switch SW(2) is shut off by a control signal from the CPU 514, the switch SW(2) is turned off, and the pull-down resistive element R(3) and the vehicle earth 518 become a non-connection state. In a state in which charging is not performed, the switch SW(2) is off, and the pull-down resistive element R(3) and the vehicle earth 518 are in the non-connection state.

The resistance circuit 502 switches the voltage of the pilot signal CPLT when the switches SW(1) and SW(2) are turned on/off depending on the control signals from the CPU 520. In other words, when the switch SW(1) is turned off and the switch SW(2) is turned off depending on the control signals from the CPU 520, the pull-down resistive elements R(2) and R(3) respectively become a state of being unconnected to the vehicle earth 518, and the voltage of the pilot signal CPLT is maintained at the initial voltage V(1). Hence, the pilot signal CPLT is maintained in a non-oscillation state.

In a state in which the switch SW(1) is off, when the switch SW(2) is turned on depending on the control signal from the CPU 520, the pull-down resistive element R(3) is connected to the vehicle earth 518, whereby the voltage of the pilot signal CPLT lowers to the oscillation voltage V(2). Furthermore, when the switch SW(1) is turned on depending on the control signal from the CPU 520, the pull-down resistive elements R(2) and R(3) are respectively connected to the vehicle earth 518, whereby the voltage of the pilot signal CPLT further lowers to the specified voltage V(3).

FIG. 25 is a flow chart showing the operation of the CPU 520 in the charging system disclosed in Patent Document 1. At step S100, the CPU 520 judges whether the voltage VL(1) of the pilot signal CPLT has changed from a voltage V(0) to the initial voltage V(1). When the voltage has changed to the initial voltage V(1) (YES at step S100), the CPU 520 starts up the charging system at step S102. For example, in the case that the CPU 512 has performed the process of the above-mentioned step S100, the CPU 512 transmits a command for activating the CPU 514 to the CPU 514.

Next, at step S104, the CPU 520 judges whether the start-up of the charging system is completed. For example, in the case that the CPU 512 has received a response signal corresponding to the activating command of the above-mentioned step S102, the CPU 520 judges that the start-up of the charging system is completed. Next, at step S106, the CPU 520 transmits the control signal for turning on the switch SW(2) to the switch SW(2). Next, at step S108, the CPU 520 starts preparation for charging. For example, the CPU 520 judges whether charging from the charging cable 300 is possible on the basis of the SOC (State Of Charge) of the electric storage device, the rated current detected depending on the duty of the pilot signal CPLT, etc.; in the case that the CPU 520 judges that charging is possible, converters and inverters provided along the route from the external power source to the electric storage device are caused to stand by in an operable state.

Next, at step S110, the CPU 520 judges whether the preparation for charging is completed. When it is judged that the preparation for charging is completed (YES at step S110), the CPU 520 transmits the control signal for turning on the switch SW(1) to the switch SW(1) at step S112). Next, at step S114, the CPU 520 turns on a relay switch on the route of charging and starts charging. At step S116, the CPU 520 judges whether charging is completed. When it is judged that charging is completed (YES at step S116), the CPU 520 transmits the control signals for turning off the switches SW(1) and SW(2) to the respective switches at step S118.

The change of the pilot signal CPLT on the basis of the operation of the CPU 520 described above will be described referring to FIG. 24. When the user connects the charging cable 300 to the power outlet 400 of the external power source at time T(1), the power from the power source 402 is supplied to the control pilot circuit 334, and the voltage of the pilot signal CPLT rises from the voltage V(0) (0 V) to the initial voltage V(1) as shown in FIG. 24. When the user connects the charging cable 300 to the charging inlet 270 of the vehicle at time T(2), the pilot signal CPLT is input to the control pilot line L(1) on the side of the vehicle.

If a configuration is used in which the resistance circuit 502 provided for the ECU 170 of the charging system is not provided with the switch SW(2), the pull-down resistive element R(3) is in a state of being connected to the vehicle earth 518 at all times; hence, at time T(2) when the charging cable 300 is connected to the vehicle, the voltage of the pilot signal CPLT lowers from the initial voltage V(1) to the oscillation voltage V(2), and the oscillator 602 of the charging cable 300 causes the pilot signal CPLT to oscillate (refer to the alternate long and short dash line B of FIG. 24). However, in the charging system according to Patent Document 1, the switch SW(2) is provided between the pull-down resistive element R(3) and the vehicle earth 518; in a state in which charging is not performed although the charging cable 300 is connected to the vehicle, the switch SW(2) is turned off, whereby the pull-down resistive element R(3) and the vehicle earth 518 are set to the non-connection state.

As a result, as indicated by the solid line A of FIG. 24, the voltage of the pilot signal CPLT is maintained at the initial voltage V(1) even when the charging cable 300 is connected to the vehicle at time T(2). Hence, in the case that the voltage VL(1) has changed from V(0) to V(1), the CPU 520 judges that the charging cable 300 has been connected to the vehicle, whereby the start-up of the charging system is started.

Moreover, when the start-up of the charging system is completed and the switch SW(2) is turned on at time T(3), the voltage of the pilot signal CPLT lowers to the oscillation voltage V(2), and the oscillation of the pilot signal CPLT is started at time T(4), whereby the preparation for charging is started. When the preparation for charging is completed and the switch SW(1) is turned on at time T(5), the voltage of the pilot signal CPLT further lowers to the voltage V(3). As a result, the relay 332 inside a connector 310 inside the charging cable 300 is turned on, and the relay switch on the route of charging on the side of the vehicle is also turned on, whereby charging is started.

PRIOR ART DOCUMENT

Patent Document

Patent Document 1: JP-2009-171733-A
Patent Document 2: JP-2009-171713-A
Patent Document 3: JP-H09-163616-A

GENERAL DESCRIPTION OF THE INVENTION

Problem that the Invention is to Solve

In the charging system according to Patent Document 1 described above, the switch SW(2) is in an ON state at all times during the period from the time when the start-up of the charging system is completed at time T(3) to the time when charging is started at time T(5). As described above, when power is supplied from the power source 516 to the switch SW(2) by the control signal from the CPU 514, the switch SW(2) is turned on; when the supply of the power is shut off, the switch SW(2) is turned off. As a result, during the stand-by period for charging from time T(3) to time T(5), the power for maintaining the switch SW(2) at the ON state is consumed.

In the charging system, in the state in which the user has connected the charging cable 300 to the vehicle, power is not always supplied unconditionally. For example, in the case that the charging system is applied to charging in which midnight power is used by timer reservation on the side of the external power source apparatus, the devices on the side of the vehicle are in the stand-by state for charging until the preparation for power supply from the external power source apparatus is completed. Furthermore, also in the case that power load is adjusted in a power source system to which numerous external power source apparatuses are attached, the devices on the side of the vehicle are also in the stand-by state for charging.

Hence, the power of the power source 516 provided for the vehicle is consumed during the period (during the stand-by period for charging) from the time when the start-up of the charging system is completed at time T(3) shown in FIG. 24 to time T(5) preset in the timer on the side of the external power source, that is, the time when the preparation for power supply from the external power source apparatus is completed. Furthermore, at least the power for keeping the CPU 514 to operate is required during this period (during the stand-by period for charging).

As described above, in the case that charging is reserved using the timer on the side of the external power source, the power of the power source mounted on the vehicle is consumed. Since the power source is also used by the ECU and other devices for controlling the entire vehicle, if the remaining capacity of the power source lowers to a predetermined level or less, a situation may occur in which the ECU cannot be activated.

To prevent the power of the power source mounted on the vehicle from being consumed, a method can be conceived in which the charging system of the vehicle is made to sleep once and then reactivated using a timer provided on the side of the vehicle. However, since the switch SW(2) is turned off during the sleep of the charging system, the external power source apparatus cannot detect that the charging cable 300 has been connected to the vehicle. If the timing when the reserved charging is started using the timer on the side of the external power source apparatus does not coincide with the timing when the charging system is activated and the switch SW(2) is turned on, there occurs a problem that charging is not started. Besides, if the time duration set in the timer on the side of the vehicle is short to increase the opportunity to start charging, the charging system is reactivated frequently, whereby the power of the power source cannot be prevented from being consumed.

Patent Document 3 discloses a configuration in which a pulse signal, generated when an operation for increasing or decreasing the remaining capacity of a high-voltage battery, such as the turning-on operation of the ignition switch, the charge switch, or the air conditioner of the vehicle, is carried out, is output as an activation request pulse, and a system for monitoring the battery mounted on the vehicle is activated in response to the activation request pulse. However, if the pulse signal is generated continuously, the start request pulse is output continuously. At this time, even if an attempt is made to stop the power supply to the battery so that the system is made to sleep, the system is reactivated by the activation request pulse being output continuously, whereby the power of the battery cannot be prevented from being consumed.

An object of the present invention is to provide a charge controller and a charging system capable of reducing power consumption in a vehicle during the stand-by period for charging and capable of starting charging stably.

Means for Solving the Problem

To solve the above-mentioned problems and to accomplish the object, Claim 1 defines a charge controller (e.g., a charge controller 21 in embodiment) configured to control a charging of a battery (e.g., a high-voltage battery 11 in embodiment) provided inside a vehicle using a control signal supplied from an external power source (e.g., an external power source apparatus 1 in embodiment) via a power cable (e.g., a charging cable 2 in embodiment), wherein the external power source apparatus switches the control signal from a non-oscillation state to an oscillation state when a preparation for power supply from the external power source apparatus is completed, wherein the charge controller includes, inside the vehicle,
a control section (e.g., a control section 45 in embodiment) which controls the charging of the battery and
an activating section (e.g., an activating section 47 in embodiment) which activates the control section, and
wherein the activating section includes
an oscillation state judgment section (e.g., an oscillation state judgment section 51 in embodiment) which judges whether the control signal input from the external power source apparatus via the power cable is in the oscillation state or the non-oscillation state and outputs an oscillation state judgment signal and
an activating signal generation section (e.g., an activating signal generation section 53 in embodiment) which generates an activating signal for activating the control section when the oscillation state judgment signal is switched from a state indicating non-oscillation to a state indicating oscillation.

Claim 2 defines, based on the above-mentioned configuration, the charge controller,
wherein the oscillation state judgment section switches the oscillation state judgment signal from the state indicating non-oscillation to the state indicating oscillation when the number of pulses of the control signal becomes equal to or more than a predetermined value.

Claim 3 defines, based on the above-mentioned configuration, the charge controller,
wherein the oscillation state judgment section includes
a pulse integration section (e.g., an integrator 63 in embodiment) which accumulates the number of pulses of the control signal during a predetermined period and
a comparison section (e.g., a comparator 65 in embodiment) which compares the accumulated number at the pulse integration section with a reference value and switches the oscillation state judgment signal from the state indicating non-oscillation to the state indicating oscillation when the accumulated number becomes equal to or more than the reference value.

Claim 4 defines, based on the above-mentioned configuration, the charge controller,
wherein the oscillation state judgment section includes a pulse-width fixed conversion section (e.g., a pulse-width fixed conversion section 61 in embodiment) which converts the control signal into a periodic signal having a constant pulse width, and
wherein the pulse integration section accumulates the number of pulses of the control signal converted so as to have the constant pulse width by the pulse-width fixed conversion section.

Claim 5 defines, based on the above-mentioned configuration, the charge controller,
wherein the oscillation state judgment section includes a frequency division section (e.g., a frequency divider circuit 71 in embodiment) which divides a frequency of the control signal, and
wherein the pulse integration section accumulates the number of pulses of the control signal, the frequency of which is divided by the frequency division section.

Claim 6 defines, based on the above-mentioned configuration, the charge controller,
wherein the pulse integration section is formed of a counting circuit which increases a count value when a pulse is input and decreases the count value when the input of the pulse stops.

Claim 7 defines, based on the above-mentioned configuration, the charge controller,
wherein the control section outputs a clear signal for stopping the activating signal generation section from generating the activating signal.

Claim 8 defines, based on the above-mentioned configuration, the charge controller,
wherein the activating signal generation section maintains the state in which the generation of the activating signal is stopped even if the oscillation state judgment signal having the state indicating oscillation remains unchanged after the generation of the activating signal is stopped in response to the clear signal.

Claim 9 defines, based on the above-mentioned configuration, the charge controller,
wherein the charge controller further includes a buffer circuit section (e.g., a buffer circuit 43 in embodiment) which converts the control signal input from the external power source apparatus into a stabilized signal having a constant voltage amplitude,
wherein the control signal converted by the buffer circuit section into the stabilized signal having the constant voltage amplitude is input to the oscillation state judgment section.

Claim 10 defines a charging system configured to charge a battery (e.g., high-voltage battery 11 in embodiment) provided inside a vehicle with power supplied from an external power source apparatus (e.g., an external power source apparatus 1 in embodiment) via a power cable (e.g., a charging cable 2 in embodiment),
wherein the external power source apparatus includes
a signal output section (e.g., a 12 V power source 35 and an oscillation circuit 37 in embodiment) which outputs an oscillation signal or a non-oscillation signal serving as a control signal for activating a charge controller provided inside the vehicle and
a switching control section (e.g., a change-over switch 39 and a control circuit 31 in embodiment) which switches the control signal from the non-oscillation signal to the oscillation signal when a preparation for power supply is completed, wherein the charge controller includes a control section (e.g., a control section 45 in embodiment) which controls a charging of the battery and an activating section (an activating section 47 in embodiment) which activates the control section, wherein the control section changes a voltage of the control signal, and wherein the activating section includes:

an oscillation state judgment section (e.g., an oscillation state judgment section 51 in embodiment) which judges whether the control signal input from the external power source apparatus via the power cable is in an oscillation state or a non-oscillation state and outputs an oscillation state judgment signal and an activating signal generation section (e.g., an activating signal generation section 53 in embodiment) which generates an activating signal for activating the control section when the oscillation state judgment signal is switched from a state indicating non-oscillation to a state indicating oscillation.

Advantage of the Invention

With the charge controller according to claims 1 to 9 and the charging system according to claim 10, power consumption in the vehicle during the stand-by period for charging can be reduced and charging can be started stably by virtue of time reservation on the side of the external power source apparatus.

With the charge controller according to claim 8, the activating signal generation section does not output the activating signal even if the oscillation state judgment signal having the state indicating oscillation remains unchanged after the generation of the activating signal is stopped in response to the clear signal, whereby the control section is not reactivated. Hence, after the end of charging, the power of the battery is not consumed by the control section.

BRIEF DESCRIPTION OF THE DRAWINGS

FIG. 3 is a view showing the relationship between the state of a pilot signal CPL and the state of an activating signal INT, including conditions under which an activating section 47 outputs the activating signal INT.

MODE FOR CARRYING OUT THE INVENTION

Figure 1:
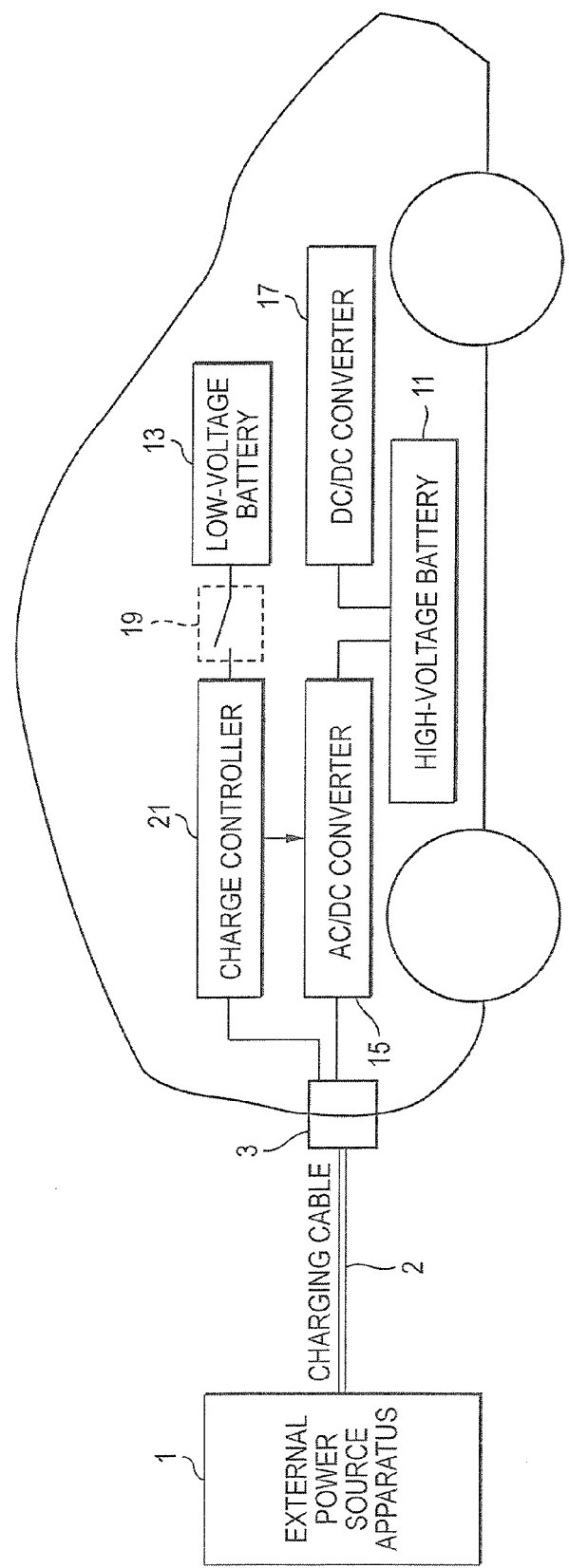
FIG. 1 is a block diagram showing a vehicle and an external power source apparatus constituting a charging system.

Embodiments according to the present invention will be described below referring to the drawings.

First Embodiment

FIG. 1 is a block diagram showing a vehicle and an external power source apparatus constituting a charging system. The vehicle constituting the charging system shown in FIG. 1 is a plug-in EV (Electrical Vehicle) or a plug-in HEV (Hybrid Electrical Vehicle), the battery of which can be charged by the power supplied from an external power source apparatus 1 connected to a commercial AC power source or the like via a charging cable 2. When the battery is charged, the charging cable 2 is connected to the charging connector 3 of the vehicle.

As shown in FIG. 1, the vehicle includes a high-voltage battery 11, a low-voltage battery 13, an AC/DC converter 15, a DC/DC converter 17, a vehicle main switch 19, and a charge controller 21. The charging of the battery described above is the charging of the high-voltage battery 11.

The high-voltage battery 11 is the high-voltage battery 11 outputting a DC high voltage of 100 to 200 V, for example. The low-voltage battery 13 is the low-voltage battery 13 outputting a DC low voltage of 12 V, for example. The output of the high-voltage battery 11 is supplied to a motor (not shown) serving as a drive source of the vehicle. Furthermore, the output of the low-voltage battery 13 is supplied to the charge controller 21 and controllers, such as an ECU for controlling the entire vehicle.

The AC/DC converter 15 converts the AC voltage from the external power source apparatus 1 into a DC voltage and supplies the DC voltage to the high-voltage battery 11. The DC/DC converter 17 lowers the output voltage of the high-voltage battery 11 and supplies the lowered voltage to the low-voltage battery 13. The vehicle main switch 19 is the ignition switch for starting the vehicle or a bypass device, controlled by the charge controller 21, for bypassing the ignition switch.

The charge controller 21 controls the charging of the high-voltage battery 11 using the power from the external power source apparatus 1. Even if the ignition switch is off, the charge controller 21 is activated by a pilot signal CPL from the external power source apparatus 1, for example; when the bypass device is turned on, the charge controller 21 is electrically connected to the low-voltage battery 13 and driven. When the charging cable 2 is connected to the charging connector 3 of the vehicle, the external power source apparatus 1 is connected to the AC/DC converter 15 and also connected to the charge controller 21. Hence, even if the ignition switch is off, the charge controller 21 according to this embodiment can be activated by the pilot signal CPL from the external power source apparatus 1 and can be driven by the power supplied from the external power source apparatus 1. (Refer to Patent Document 3.)

Figure 2:
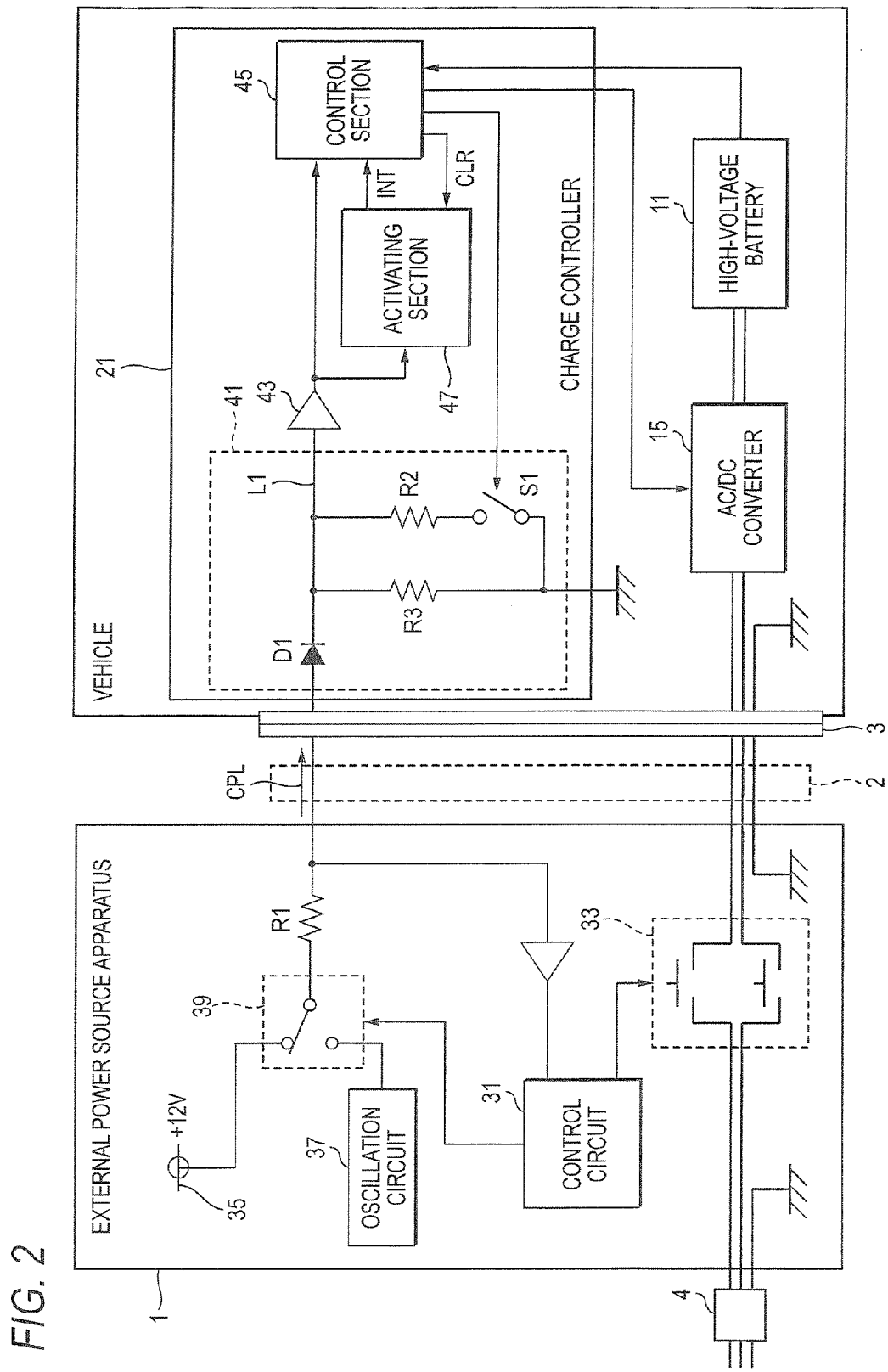
FIG. 2 is a view showing the internal configurations of an external power source apparatus 1 and a charge controller 21.

FIG. 2 is a view showing the internal configurations of the external power source apparatus 1 and the charge controller 21. As shown in FIG. 2, the external power source apparatus 1 has a control circuit 31, a main switch 33, a 12 V power source 35, an oscillation circuit 37, and a change-over switch 39. The control circuit 31 incorporates a timer, not shown, and controls the change-over switch 39 when the time preset in the timer is reached. In addition, the control circuit 31 performs the on/off control of the main switch 33 depending on the voltage of the pilot signal CPL.

The main switch 33 is provided on a power transmission route from a commercial AC power source or the like that is connected thereto via an AC plug 4. The 12 V power source 35 outputs a 12 V DC voltage signal. The oscillation circuit 37 outputs an oscillation signal. The change-over switch 39 switches the pilot signal CPL to be input to the charge controller 21 to the 12 V DC voltage signal (non-oscillation signal) or the oscillation signal.

As shown in FIG. 2, the charge controller 21 has an input circuit 41, a buffer circuit 43, a control section 45, and an activating section 47. The input circuit 41 has a reverse-flow prevention diode D1 provided on a control pilot line L1 through which the pilot signal CPL is transmitted, resistors R2 and R3, and a switch S1. The resistor R3 is provided between the control pilot line L1 and the ground. In addition, the resistors R2 and the switch S1, connected in series, are provided in parallel with the resistor R3 and between the control pilot line L1 and the ground. The switch S1 is on/off controlled by the control section 45.

The buffer circuit 43 converts the pilot signal CPL output from the input circuit 41 into a stabilized signal having a constant voltage amplitude. The control section 45 performs the on/off control of the switch S1, generates a clear signal CLR to be output to the activating section 47, performs the charging control of the high-voltage battery 11 by performing the switching control of the AC/DC converter 15, and monitors the state of charge (SOC or the like) of the high-voltage battery 11. The control section 45 is activated when an activating signal INT described later is input.

The activating section 47 outputs the activating signal INT depending on the oscillation state of the pilot signal CPL. The activating signal INT is a signal for activating the control section 45 not operating and is input to the control section 45. FIG. 3 is a view showing the relationship between the state of the pilot signal CPL and the state of the activating signal INT, including conditions under which the activating section 47 outputs the activating signal INT. The left-pointing arrow (←) shown in FIG. 3 indicates that the state of the activating signal INT is unchanged from the previous state thereof. When the state of the pilot signal CPL changes from the non-oscillation state to the oscillation state, the activating section 47 outputs the activating signal INT as indicated by the broken line shown in FIG. 3.

Figure 4:
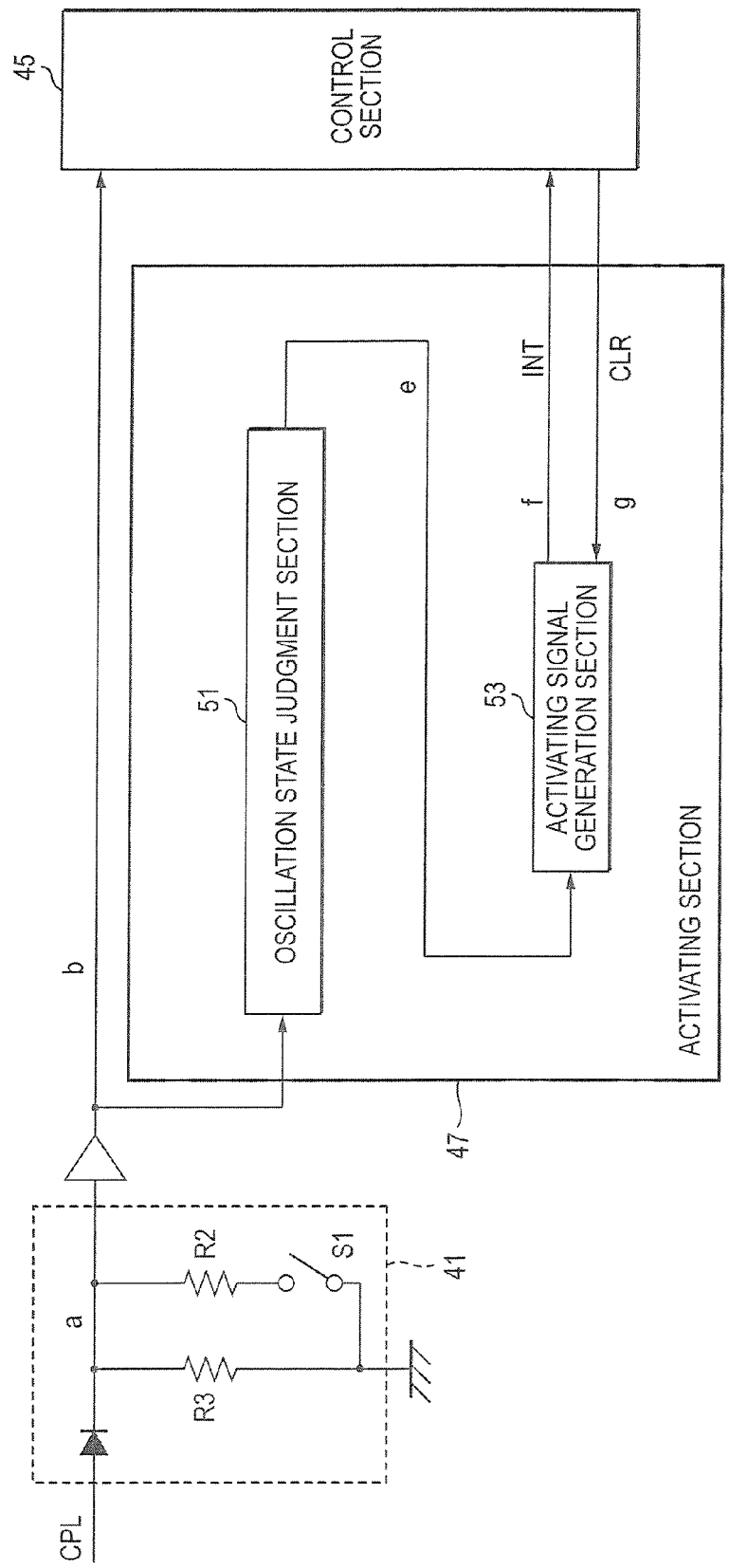
FIG. 4 is a view showing the internal configuration of the activating section 47 according to a first embodiment.

FIG. 4 is a view showing the internal configuration of the activating section 47 according to the first embodiment. As shown in FIG. 4, the activating section 47 according to the first embodiment has an oscillation state judgment section 51 and an activating signal generation section 53. The oscillation state judgment section 51 judges whether the pilot signal CPL having been converted by the buffer circuit 43 into the stabilized signal having the constant voltage amplitude is in the oscillation state. In the case that the pilot signal CPL is in the oscillation state, the oscillation state judgment section 51 outputs a signal indicating that the pilot signal CPL is in the oscillation state to the activating signal generation section 53. In the case that the activating signal generation section 53 is in a no signal input state, when the signal indicating that the pilot signal CPL is in the oscillation state is input thereto, the activating signal generation section 53 outputs the activating signal INT. When the clear signal CLR is input from the control section 45, the activating signal generation section 53 stops the output of the activating signal INT. Hence, even if the oscillation state of the pilot signal CPL continues, the activating signal INT can be erased and the charging system can be stopped.

Figure 5:
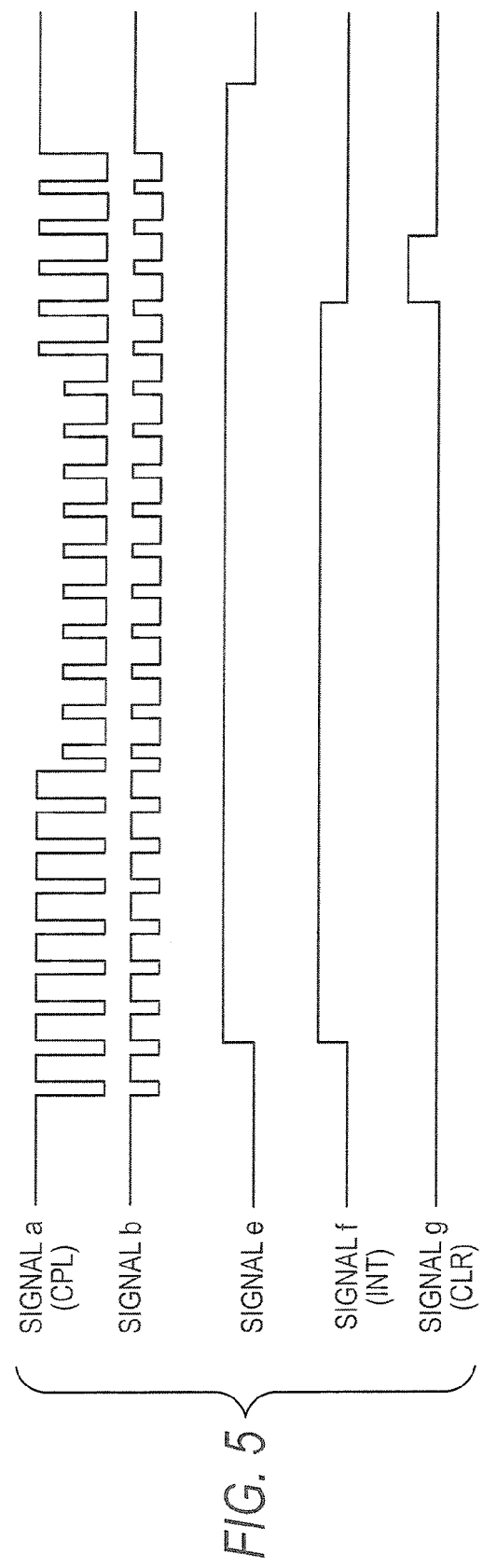
FIG. 5 is a timing chart showing the timings of the pilot signal CPL, the activating signal INT, etc. when the control section 45 provided for the charge controller 21 of the vehicle according to the first embodiment is activated.

FIG. 5 is a timing chart showing the timings of the pilot signal CPL, the activating signal INT, etc. when the control section 45 provided for the charge controller 21 of the vehicle according to the first embodiment is activated. The signals respectively indicated by letters a to g shown in FIG. 5 are signals being present on the lines indicated by the same letters shown in FIG. 4.

When the time preset in the control circuit 31 of the external power source apparatus 1 is reached, the control circuit 31 switches the change-over switch 39 to the position for the oscillation circuit 37. As a result, as shown in FIG. 5, the state of the pilot signal CPL (signal a) changes from the non-connection state to the oscillation state. At this time, on the basis of a signal b, that is, the stabilized signal having the constant voltage amplitude obtained when the pilot signal CPL was converted by the buffer circuit 43, the oscillation state judgment section 51 of the activating section 47 outputs a signal e having a logical state of H (high) indicating that the pilot signal CPL is in the oscillation state. Since the signal e has been input, the activating signal generation section 53 of the activating section 47 outputs the activating signal INT (signal f). The control section 45 is activated by the activating signal INT.

The activated control section 45 turns on the switch S1 of the input circuit 41. As a result, as shown in FIG. 5, the voltage of the pilot signal CPL (signal a) lowers. Upon detecting the voltage drop of the pilot signal CPL (signal a), the control circuit 31 of the external power source apparatus 1 turns on the main switch 33. Hence, the charging of the high-voltage battery 11 is started.

When the control section 45 turns off the switch S1 because the high-voltage battery 11 has reached a desired state of charge, the voltage of the pilot signal CPL (signal a) rises as shown in FIG. 5. At this time, the control circuit 31 of the external power source apparatus 1 turns off the main switch 33, whereby the supply of power is stopped and the charging of the high-voltage battery 11 comes to an end. Even if the pilot signal CPL (signal a) keeps the oscillation state at that time, since the control section 45 inputs the clear signal CLR (signal g) to the activating section 47, the activating section 47 can stop the output of the activating signal INT (signal f). Since the control section 45 stops its operation, the power of the power source mounted on the vehicle can be prevented from being consumed.

Furthermore, as shown in FIG. 5, in the case that the pilot signal CPL (signal a) keeps the oscillation state, the logical state of H (high) of the signal e remains unchanged; however, in the case that the clear signal CLR (signal g) is input to the activating section 47, the output of the activating signal INT (signal f) is stopped. After this, the state of the activating signal INT (signal f) remains unchanged from the previous state thereof even when the oscillation state of the pilot signal CPL (signal a) remains unchanged as indicated by an alternate long and two short dashes line shown in FIG. 3 and even when the state of the pilot signal CPL (signal a) changes from the oscillation state to the non-connection state as indicated by an alternate long and short dash line shown in FIG. 3. As a result, even if the logical state of H (high) of the signal e remains unchanged because the pilot signal CPL (signal a) keeps the oscillation state, the activating section 47 does not output the activating signal INT (signal f) and the control section 45 is not reactivated. Hence, after the end of the charging of the high-voltage battery 11, the power of the power source mounted on the vehicle is not consumed by the control section 45.

As described above, according to this embodiment, when the charging of the high-voltage battery 11 provided for the vehicle is performed by timer reservation having been set in the external power source apparatus 1, the charge controller 21 of the vehicle does not consume the power of the low-voltage battery 13 during the stand-by period. As described above, even in the state that no power is supplied from the low-voltage battery 13 to the charge controller 21, when the preset time is reached, the pilot signal CPL being output from the external power source apparatus 1 becomes the oscillation state. Hence, the control section 45 is activated by the activating section 47 of the charge controller 21, and the charging of the high-voltage battery 11 is started. Furthermore, since the control section 45 is stopped when the charging comes to an end, the power of the power source mounted on the vehicle can be prevented from being consumed.

Second Embodiment

A second embodiment is different from the first embodiment in the configuration of the activating section provided for the charge controller of the vehicle. Except for this, the second embodiment is similar to the first embodiment, and the descriptions of components common to those according to the first embodiment are simplified or omitted.

Figure 6:
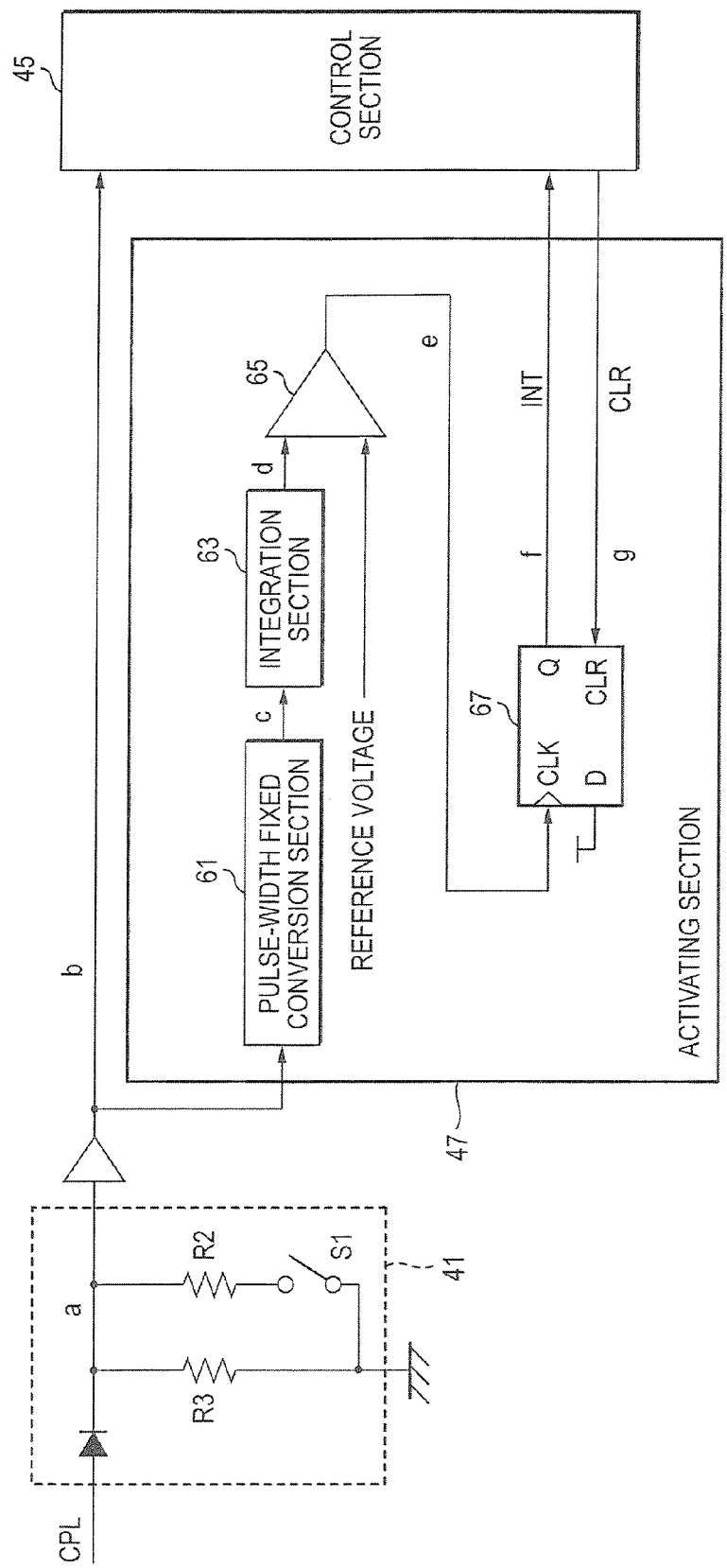
FIG. 6 is a view showing the internal configuration of an activating section 47 according to a second embodiment.
Figure 7:
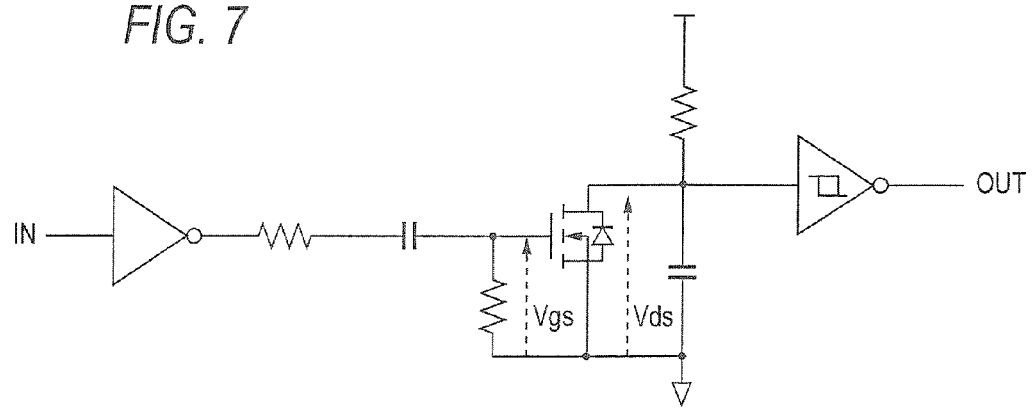
FIG. 7 is a view showing a specific circuit configuration of a pulse-width fixed conversion section 61.
Figure 8:
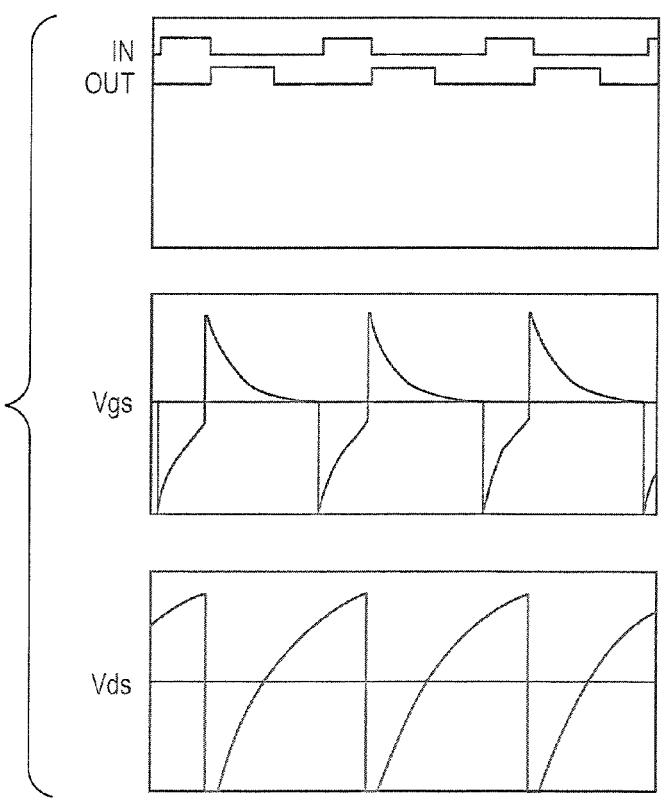
FIG. 8 is a graph showing various voltages in the circuit of the pulse-width fixed conversion section 61 shown in FIG. 7.
Figure 9:
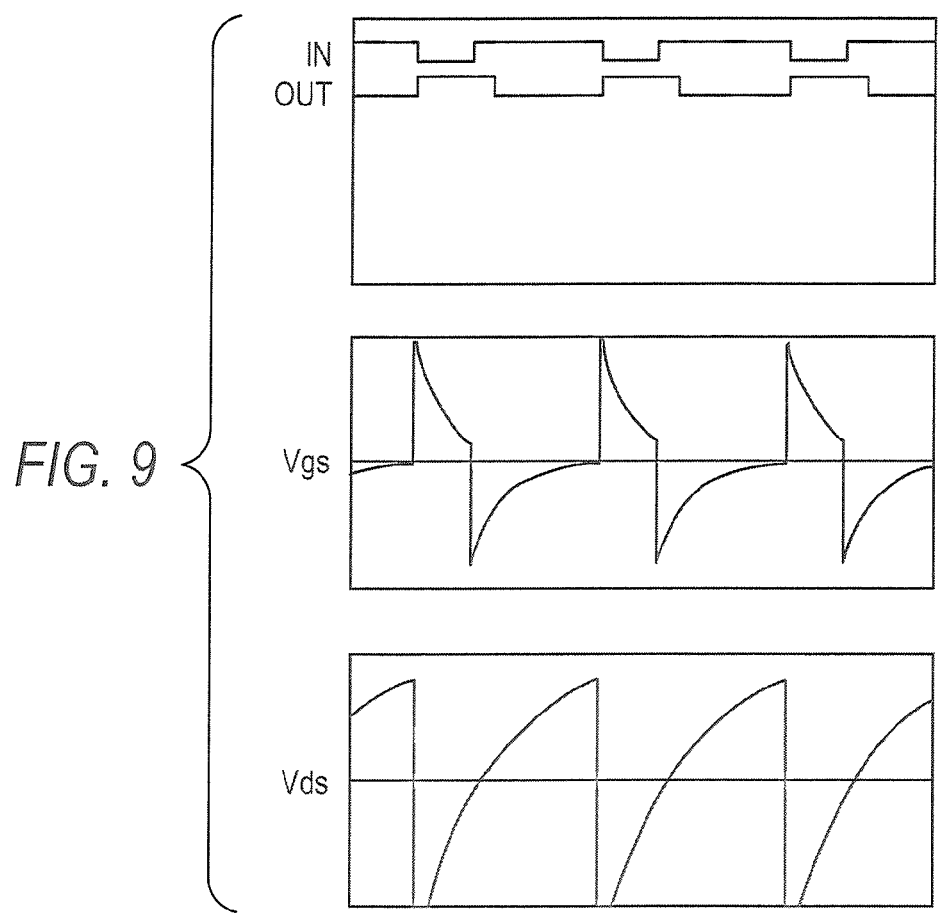
FIG. 9 is a graph showing various voltages in the circuit of the pulse-width fixed conversion section 61 shown in FIG. 7.

FIG. 6 is a view showing the internal configuration of the activating section 47 according to the second embodiment. As shown in FIG. 6, the activating section 47 according to the second embodiment has a pulse-width fixed conversion section 61, an integrator 63, a comparator 65, and a D-type flip-flop (D-FF) 67. The pulse-width fixed conversion section 61 converts the pilot signal CPL having been converted by the buffer circuit 43 into the stabilized signal having the constant voltage amplitude into a periodic signal having a constant pulse width. FIG. 7 shows a specific circuit configuration of the pulse-width fixed conversion section 61. In addition, FIGS. 8 and 9 are graphs showing various voltages in the circuit of the pulse-width fixed conversion section 61 shown in FIG. 7.

Figure 10:
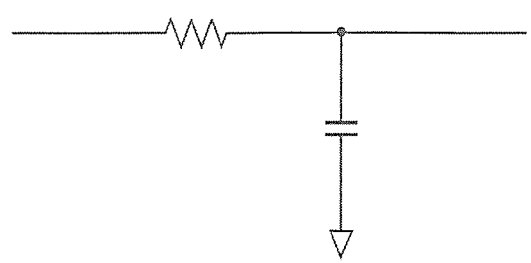
FIG. 10 is a view showing a specific circuit configuration of an integrator 63.
Figure 11:
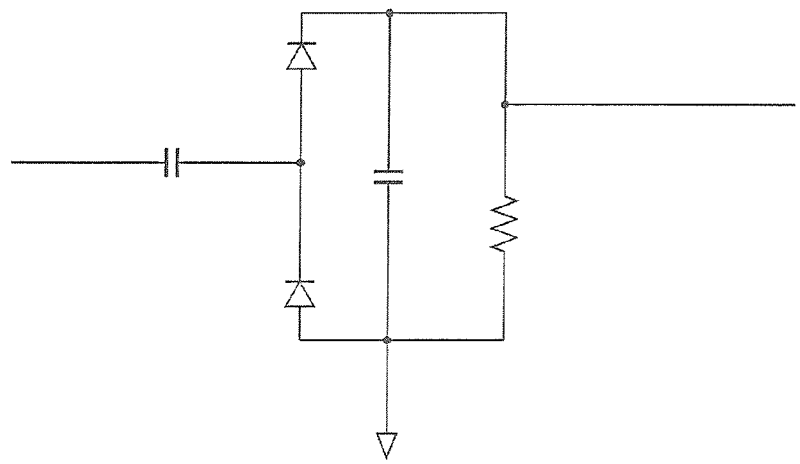
FIG. 11 is a view showing a specific circuit configuration of an integrator 63.
Figure 12:
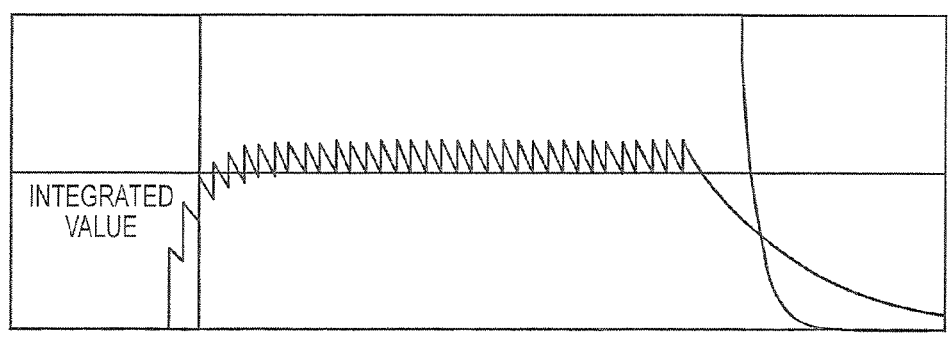
FIG. 12 is a view showing an example of the output signal of the integrator 63 and the output signal of a comparator 65.

The integrator 63 accumulates the number of pulses of the periodic signal output from the pulse-width fixed conversion section 61 during a predetermined period. The voltage of the signal output from the integrator 63 indicates the accumulated number of pulses. FIGS. 10 and 11 show specific circuit configurations of the integrator 63. The comparator 65 compares the voltage (hereafter referred to "accumulated pulse voltage") of the signal output from the integrator 63 with a reference voltage and outputs a signal having a logical state of H (high) when the accumulated pulse voltage becomes equal to or more than the reference voltage. FIG. 12 shows examples of the output signal of the integrator 63 and the output signal of the comparator 65.

The output signal of the comparator 65 is input to the D-FF 67 as a clock signal. In addition, when the output signal of the comparator 65 having been input as the clock signal rises, the D-FF 67 outputs the activating signal INT. The clear signal CLR output from the control section 45 is input to the clear terminal of the D-FF 67. When the clear signal CLR is input to the clear terminal, the D-FF 67 stops the output of the activating signal INT.

Figure 13:
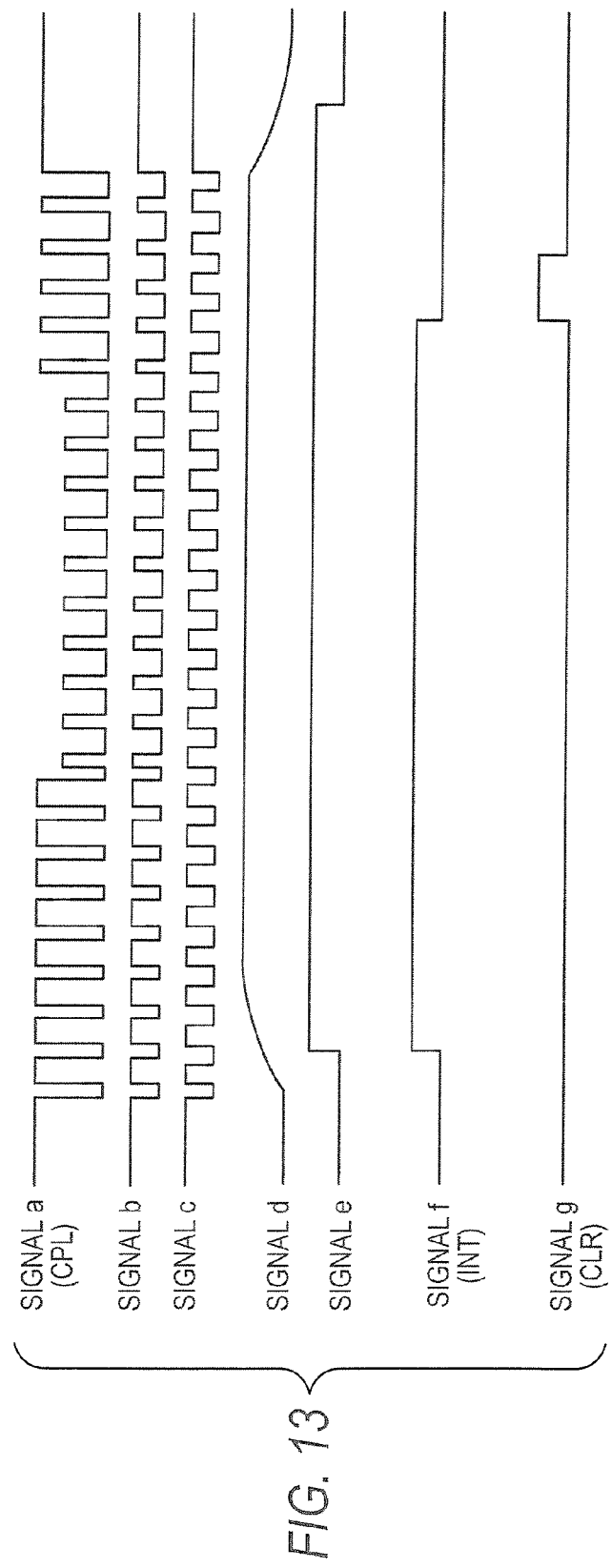
FIG. 13 a timing chart showing the timings of the pilot signal CPL, the activating signal INT, etc. when the control section 45 provided for the charge controller 21 of the vehicle according to the second embodiment is activated.

FIG. 13 a timing chart showing the timings of the pilot signal CPL, the activating signal INT, etc. when the control section 45 provided for the charge controller 21 of the vehicle according to the second embodiment is activated. The signals respectively indicated by letters a to g shown in FIG. 13 are signals being present on the lines indicated by the same letters shown in FIG. 6.

When the time preset in the control circuit 31 of the external power source apparatus 1 is reached, the control circuit 31 switches the change-over switch 39 to the position for the oscillation circuit 37. As a result, as shown in FIG. 13, the state of the pilot signal CPL (signal a) changes from the non-connection state to the oscillation state. At this time, the pulse-width fixed conversion section 61 of the activating section 47 converts the signal b, that is, the stabilized signal having the constant voltage amplitude obtained when the pilot signal CPL was converted by the buffer circuit 43, into the periodic signal (signal c) having the constant pulse width.

The integrator 63 outputs a signal d having an accumulated pulse voltage corresponding to the value of the accumulated number of pulses of the signal c during the predetermined period. The comparator 65 outputs a signal e having a logical state of H (high) when the voltage (accumulated pulse voltage) of the signal d becomes equal to or more than the reference voltage. The D-FF 67 outputs the activating signal INT (signal f) when the signal e output from the comparator 65 rises. The control section 45 is activated by the activating signal INT.

The activated control section 45 turns on the switch S1 of the input circuit 41. As a result, as shown in FIG. 13, the voltage of the pilot signal CPL (signal a) lowers. Upon detecting the voltage drop of the pilot signal CPL (signal a), the control circuit 31 of the external power source apparatus 1 turns on the main switch 33. Hence, the charging of the high-voltage battery 11 is started.

When the control section 45 turns off the switch S1 because the high-voltage battery 11 has reached a desired state of charge, the voltage of the pilot signal CPL (signal a) rises as shown in FIG. 13. At this time, the control circuit 31 of the external power source apparatus 1 turns off the main switch 33, whereby the supply of power is stopped and the charging of the high-voltage battery 11 comes to an end. Even if the pilot signal CPL (signal a) keeps the oscillation state at that time, since the control section 45 inputs the clear signal CLR (signal g) to the activating section 47, the activating section 47 can stop the output of the activating signal INT (signal f). Since the control section 45 stops its operation, the power of the power source mounted on the vehicle can be prevented from being consumed.

Furthermore, as shown in FIG. 13, in the case that the pilot signal CPL (signal a) keeps the oscillation state, the logical state of H (high) of the signal e remains unchanged; however, in the case that the clear signal CLR (signal g) is input to the activating section 47, the output of the activating signal INT (signal f) is stopped. After this, the state of the activating signal INT (signal f) remains unchanged from the previous state thereof even when the oscillation state of the pilot signal CPL (signal a) remains unchanged as indicated by the alternate long and two short dashes line shown in FIG. 3 and even when the state of the pilot signal CPL (signal a) changes from the oscillation state to the non-connection state as indicated by the alternate long and short dash line shown in FIG. 3. As a result, even if the logical state of H (high) of the signal e remains unchanged because the pilot signal CPL (signal a) keeps the oscillation state, the activating section 47 does not output the activating signal INT (signal f) and the control section 45 is not reactivated. Hence, after the end of the charging of the high-voltage battery 11, the power of the power source mounted on the vehicle is not consumed by the control section 45.

As described above, according to this embodiment, when the charging of the high-voltage battery 11 provided for the vehicle is performed by timer reservation having been set in the external power source apparatus 1, the charge controller 21 of the vehicle does not consume the power of the low-voltage battery 13 during the stand-by period. Furthermore, when the preset time is reached and when the pilot signal CPL output from the external power source apparatus 1 becomes the oscillation state, charging is started after the number of pulses of the pilot signal CPL has reached a predetermined number. Hence, charging is not started by the pilot signal CPL having been affected by noise or the like.

Third Embodiment

A third embodiment is different from the second embodiment in the configuration of the activating section provided for the charge controller of the vehicle. In the third embodiment, a frequency divider circuit is provided instead of the pulse-width fixed conversion section 61 provided for the activating section 47 according to the second embodiment. Except for this, the third embodiment is similar to the second embodiment, and the descriptions of components common to those according to the second embodiment are simplified or omitted.

Figure 14:
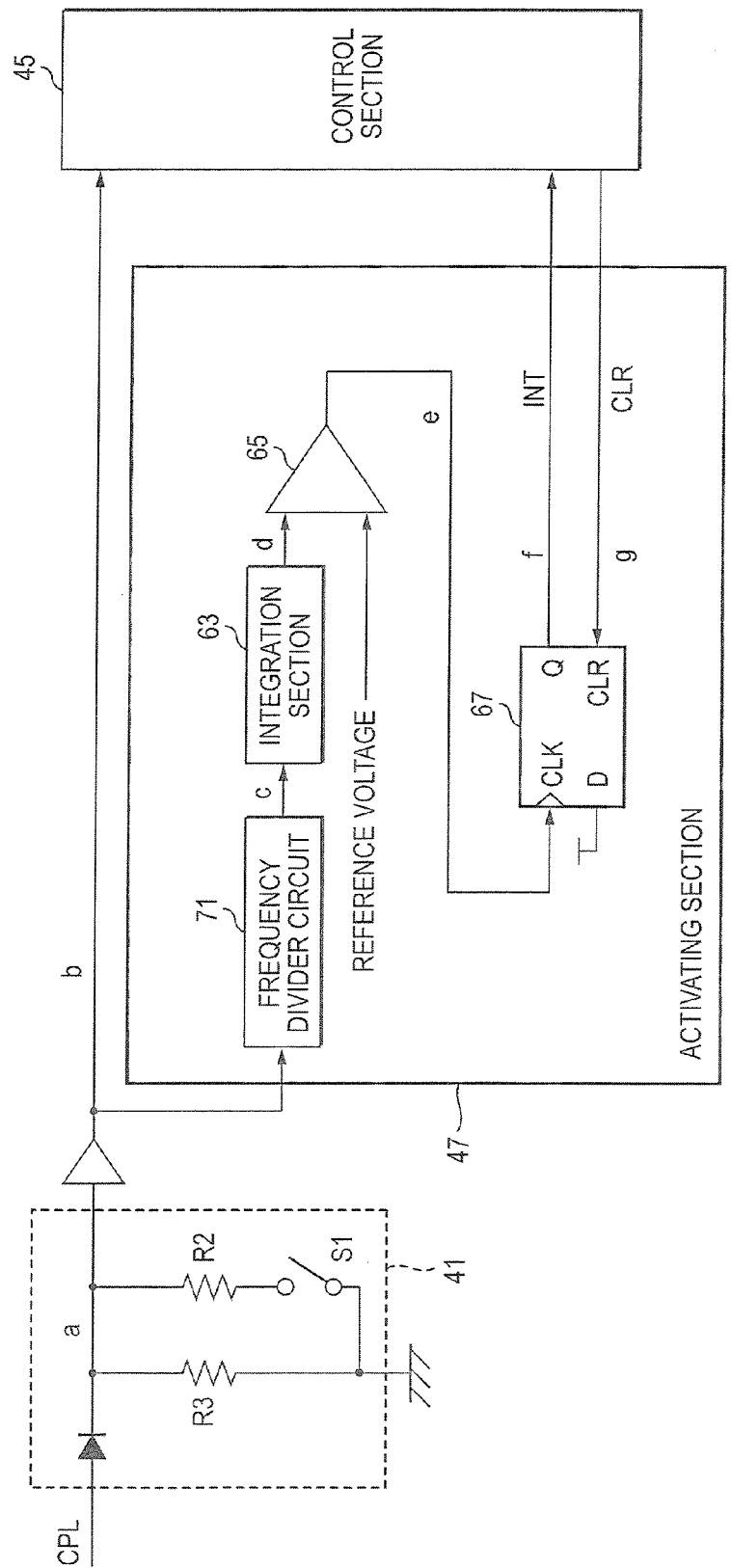
FIG. 14 is a view showing the internal configuration of an activating section 47 according to a third embodiment.
Figure 15:
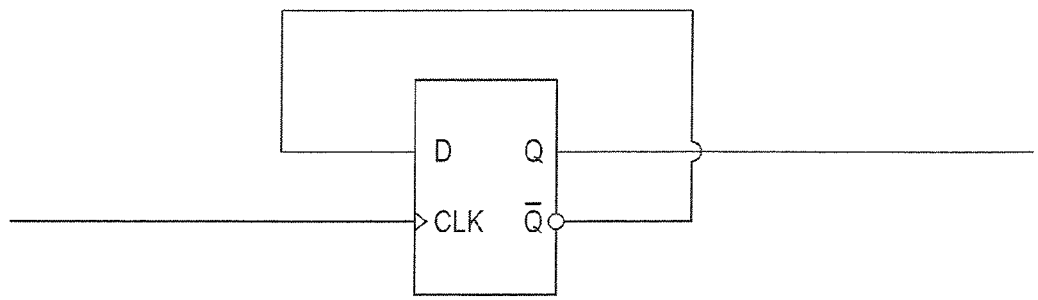
FIG. 15 is a view showing a specific circuit configuration of a frequency divider circuit 71.
Figure 16:
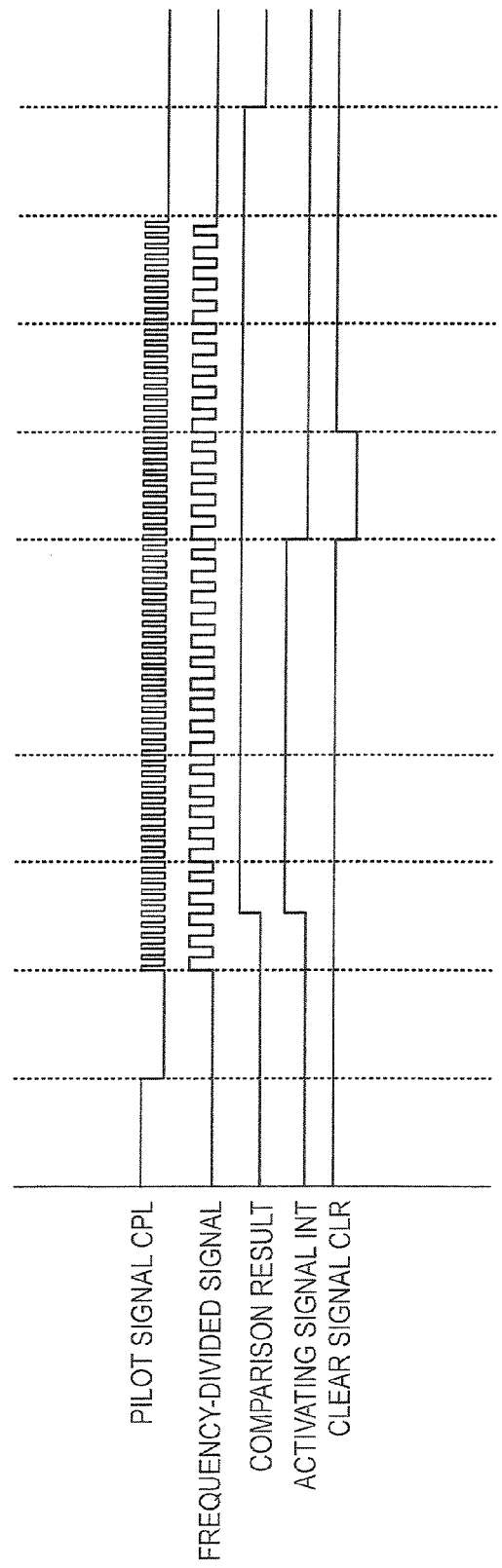
FIG. 16 a view showing a graph of various signals in the activating section 47 according to the third embodiment.

FIG. 14 is a view showing the internal configuration of the activating section 47 according to the third embodiment. The frequency divider circuit 71 provided for the activating section 47 according to the third embodiment divides the frequency of the pilot signal CPL having been converted by the buffer circuit 43 into the stabilized signal having the constant voltage amplitude and outputs a periodic signal having a constant pulse width, the cycle of which is longer than that of the pilot signal CPL. FIG. 15 shows a specific circuit configuration of the frequency divider circuit 71. When the oscillation of the pilot signal CPL stops, the frequency-divided signal (signal c) stops in a logical state of H (high) or L (low). For the purpose of lowering the voltage (accumulated pulse voltage) of the signal d when the frequency-divided signal (signal c) stops in the logical state of H (high), it is desired that such an integrator as shown in FIG. 11 should be used. In addition, FIG. 16 is a graph showing various signals in the activating section 47 according to the third embodiment.

Figure 17:
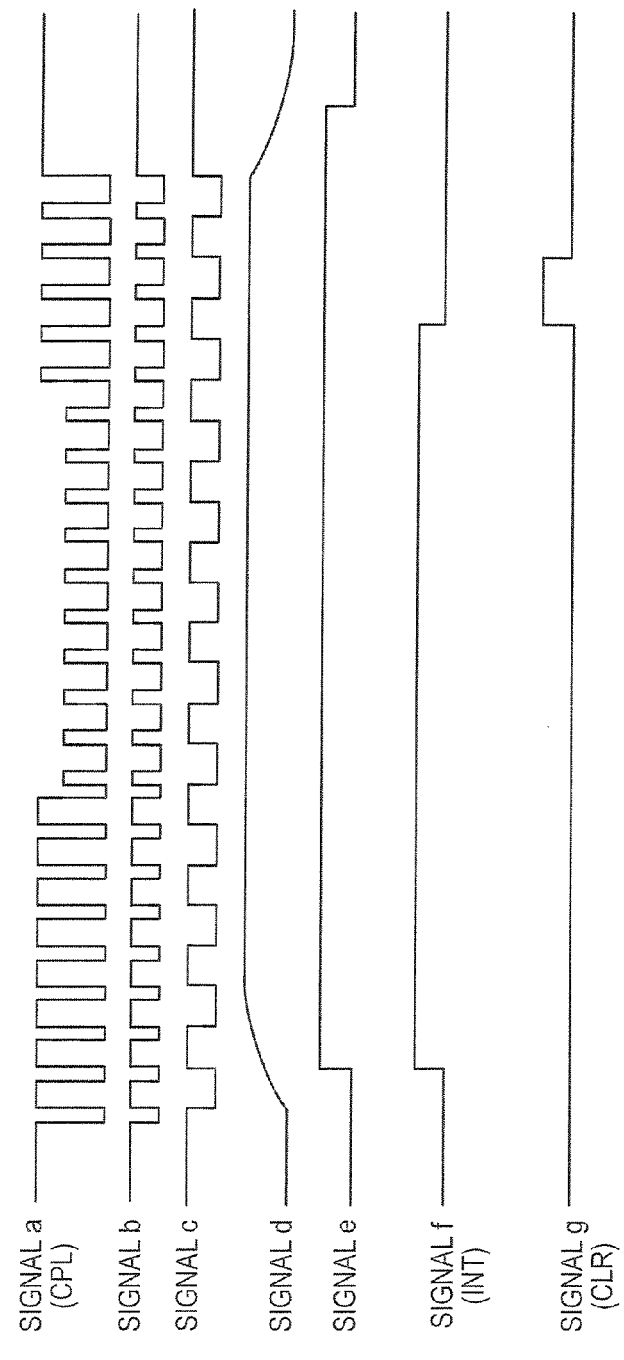
FIG. 17 a timing chart showing the timings of the pilot signal CPL, the activating signal INT, etc. when the control section 45 provided for the charge controller 21 of the vehicle according to the third embodiment is activated.

FIG. 17 a timing chart showing the timings of the pilot signal CPL, the activating signal INT, etc. when the control section 45 provided for the charge controller 21 of the vehicle according to the third embodiment is activated. The signals respectively indicated by letters a to g shown in FIG. 17 are signals being present on the lines indicated by the same letters shown in FIG. 14.

When the time preset in the control circuit 31 of the external power source apparatus 1 is reached, the control circuit 31 switches the change-over switch 39 to the position for the oscillation circuit 37. As a result, as shown in FIG. 17, the state of the pilot signal CPL (signal a) changes from the non-connection state to the oscillation state. At this time, the frequency divider circuit 71 of the activating section 47 divides the frequency of the signal b, that is, the stabilized signal having the constant voltage amplitude obtained when the pilot signal CPL was converted by the buffer circuit 43, and outputs the periodic signal (signal c) having the constant pulse width, the cycle of which is longer than that of the pilot signal CPL. Signals and processes to be used hereafter are similar to those according to the second embodiment shown in FIG. 13.

As described above, according to this embodiment, when the charging of the high-voltage battery 11 provided for the vehicle is performed by timer reservation having been set in the external power source apparatus 1, the charge controller 21 of the vehicle does not consume the power of the low-voltage battery 13 during the stand-by period. Furthermore, when the preset time is reached and when the pilot signal CPL output from the external power source apparatus 1 becomes the oscillation state, charging is started after the number of pulses of the frequency-divided signal c has reached a predetermined number. Since the integrator 63 accumulates the number of pulses of the frequency-divided signal c, the processing capacity of the integrator 63 is not required to be high.

Fourth Embodiment

A fourth embodiment is different from the second embodiment in the configuration of the activating section provided for the charge controller of the vehicle. In the fourth embodiment, a counting circuit is provided instead of the pulse-width fixed conversion section 61 and the integrator 63 provided for the activating section 47 according to the second embodiment. Except for this, the fourth embodiment is similar to the second embodiment, and the descriptions of components common to those according to the second embodiment are simplified or omitted.

Figure 18:
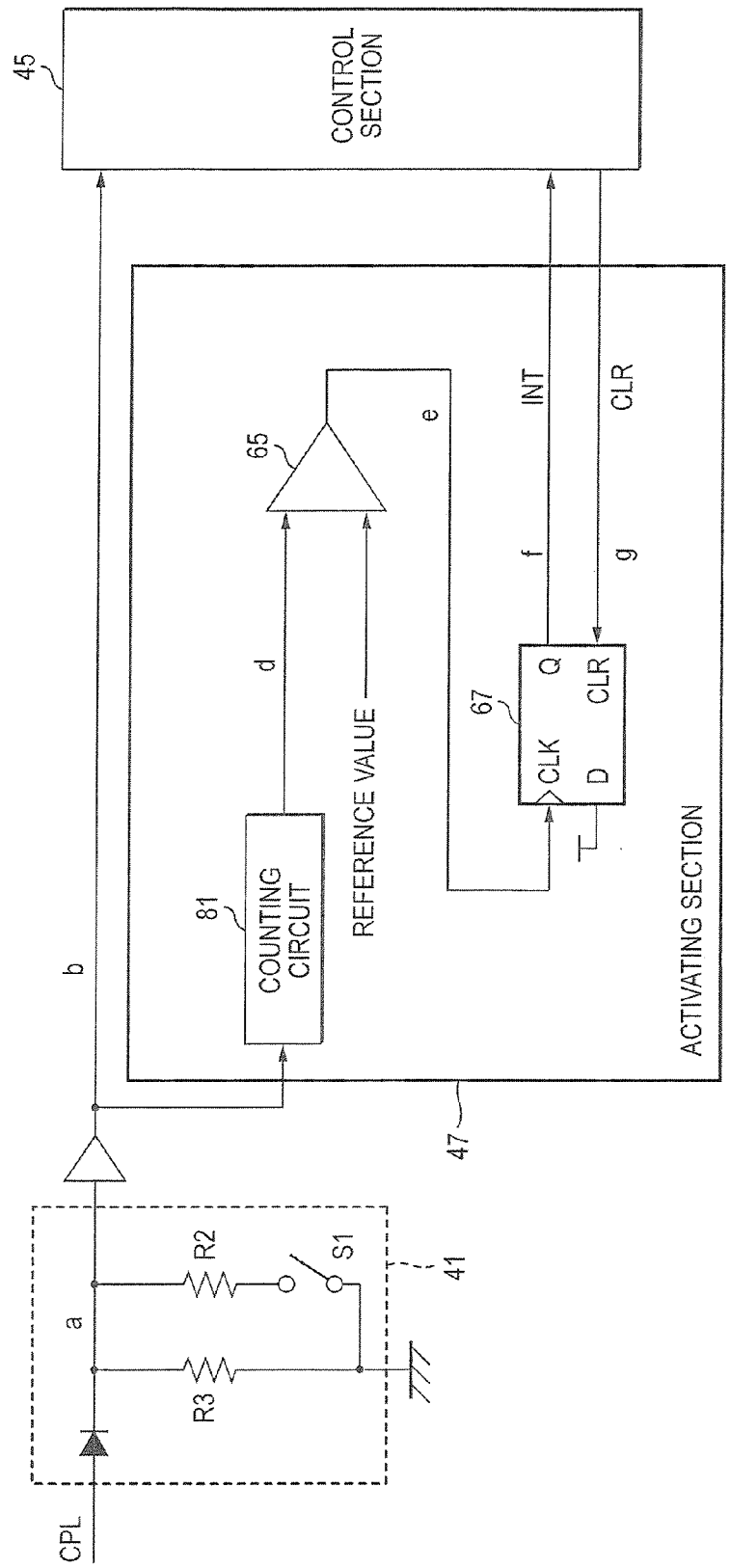
FIG. 18 is a view showing the internal configuration of an activating section 47 according to a fourth embodiment.
Figure 19:
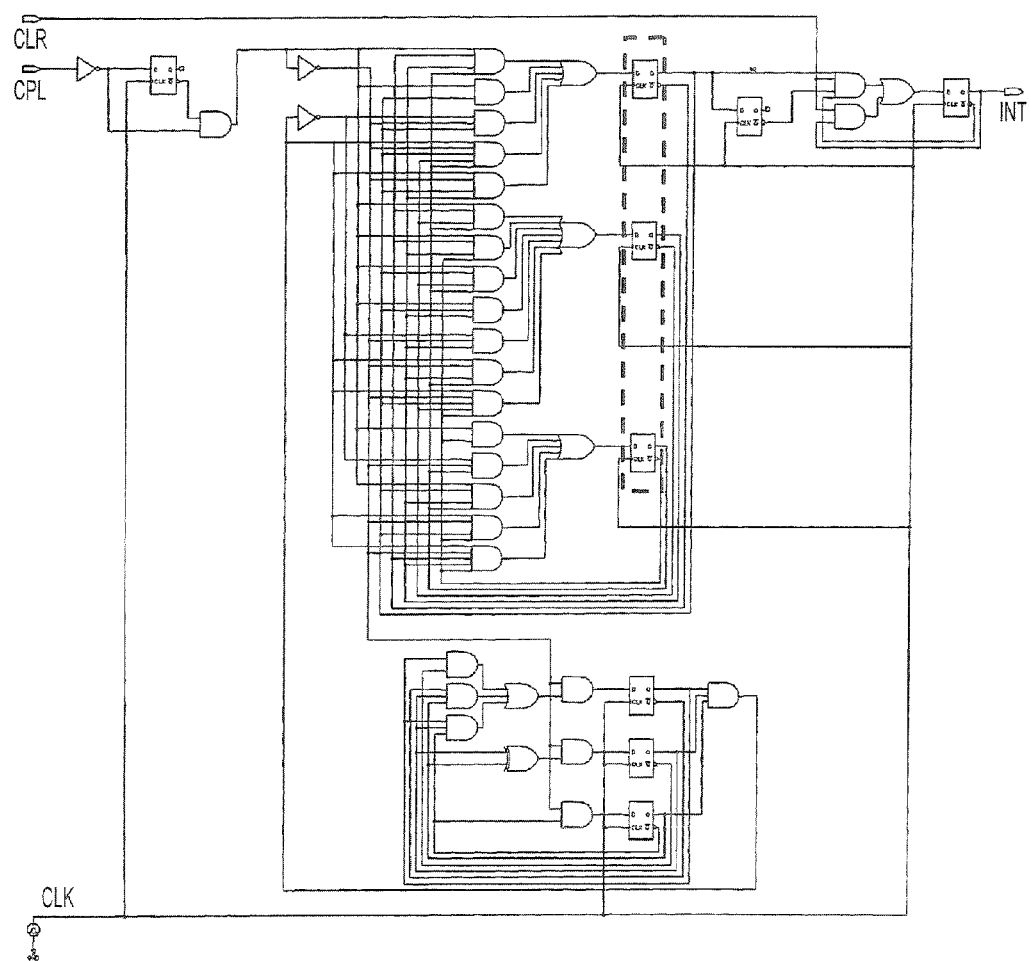
FIG. 19 is a view showing an integrated circuit configuration of a counting circuit 81, a comparator 65, and a D-FF 67.
Figure 20:
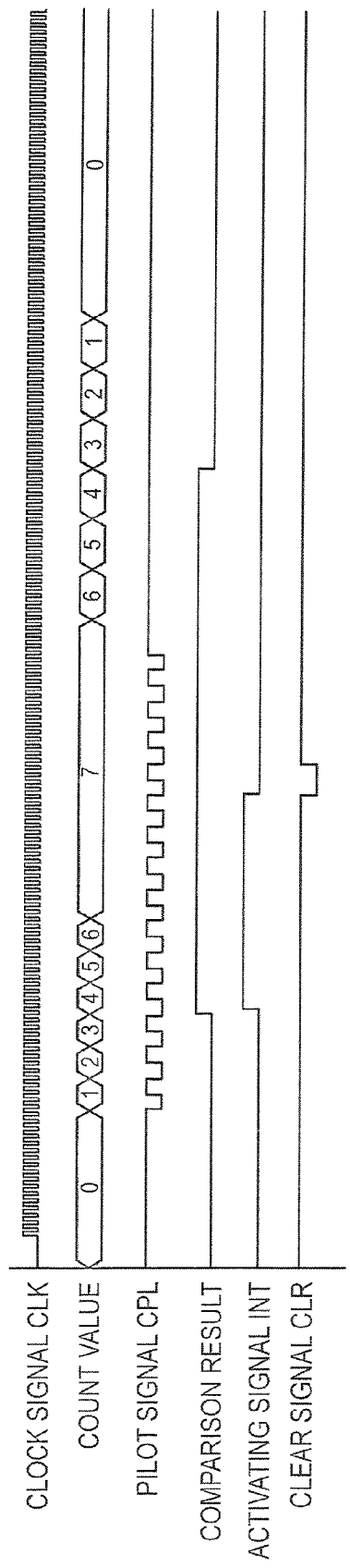
FIG. 20 is a graph showing various signals in the activating section 47 according to the fourth embodiment.

FIG. 18 is a view showing the internal configuration of the activating section 47 according to the fourth embodiment. The counting circuit 81 provided for the activating section 47 according to the fourth embodiment counts the number of pulses of the pilot signal CPL having been converted by the buffer circuit 43 into the stabilized signal having the constant voltage amplitude, during a predetermined period. The voltage of the signal output from the counting circuit 81 indicates the number of counts. FIG. 19 shows an integrated circuit configuration of the counting circuit 81, the comparator 65, and the D-FF 67. The circuit shown in FIG. 19 is formed of a 3-bit counter. In addition, FIG. 20 is a graph showing various signals in the activating section 47 according to the fourth embodiment.

Figure 21:
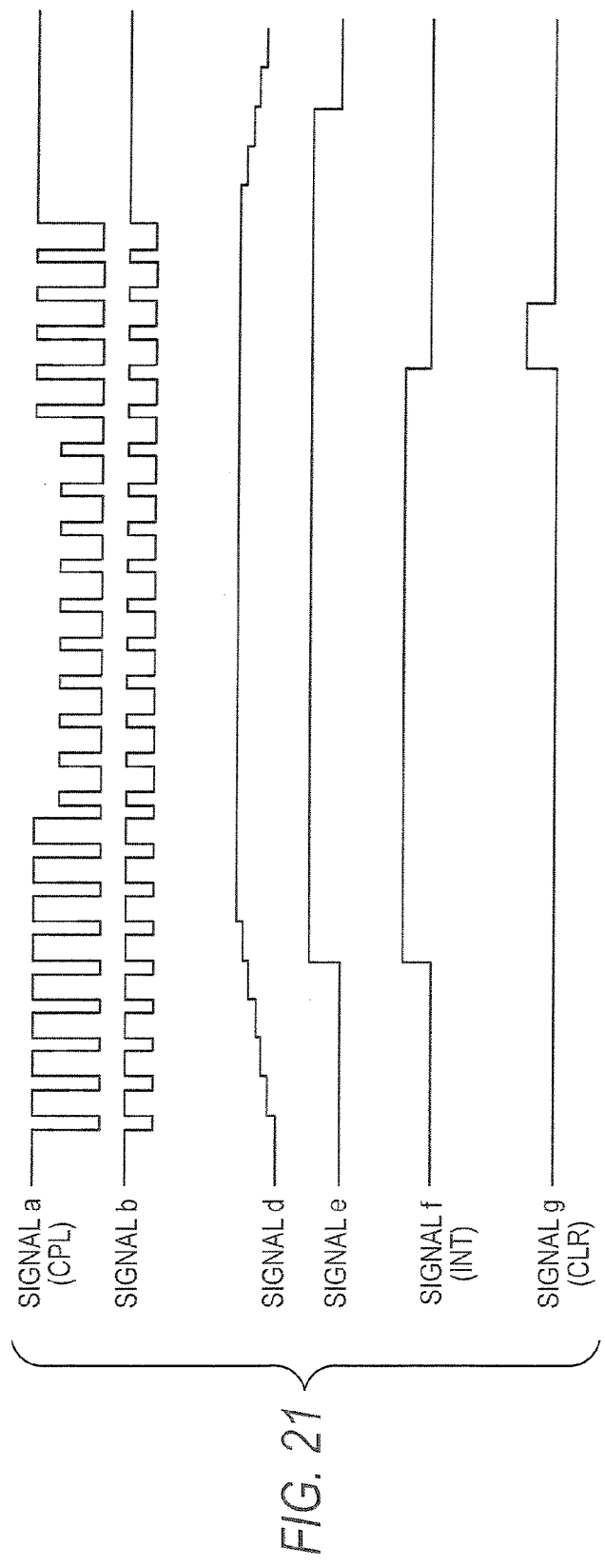
FIG. 21 a timing chart showing the timings of the pilot signal CPL, the activating signal INT, etc. when the control section 45 provided for the charge controller 21 of the vehicle according to the fourth embodiment is activated.
Figure 22:
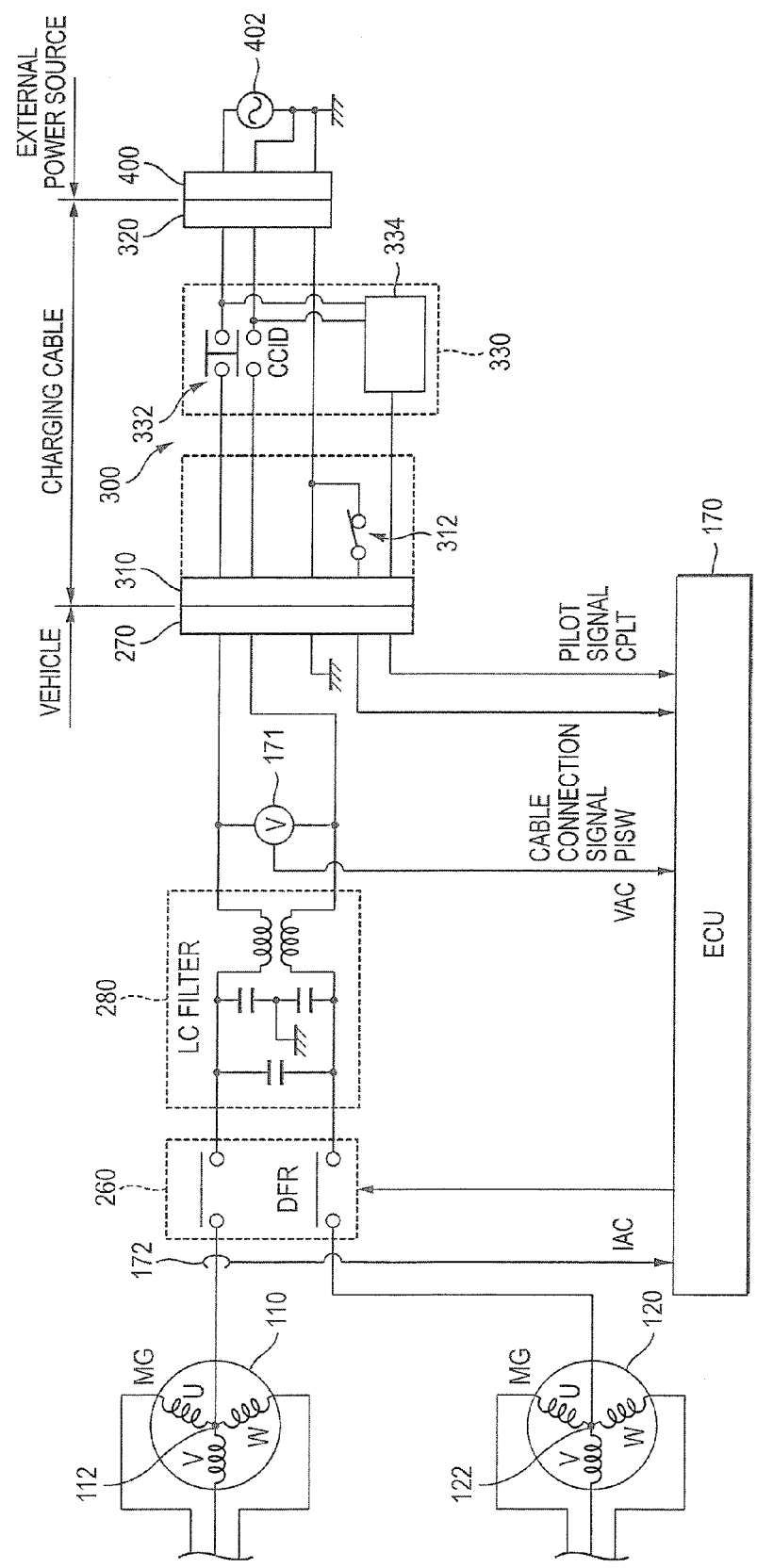
FIG. 22 is a view showing the schematic configuration of a part relating to the charging system of the plug-in hybrid vehicle disclosed in Patent Document 1.
Figure 23:
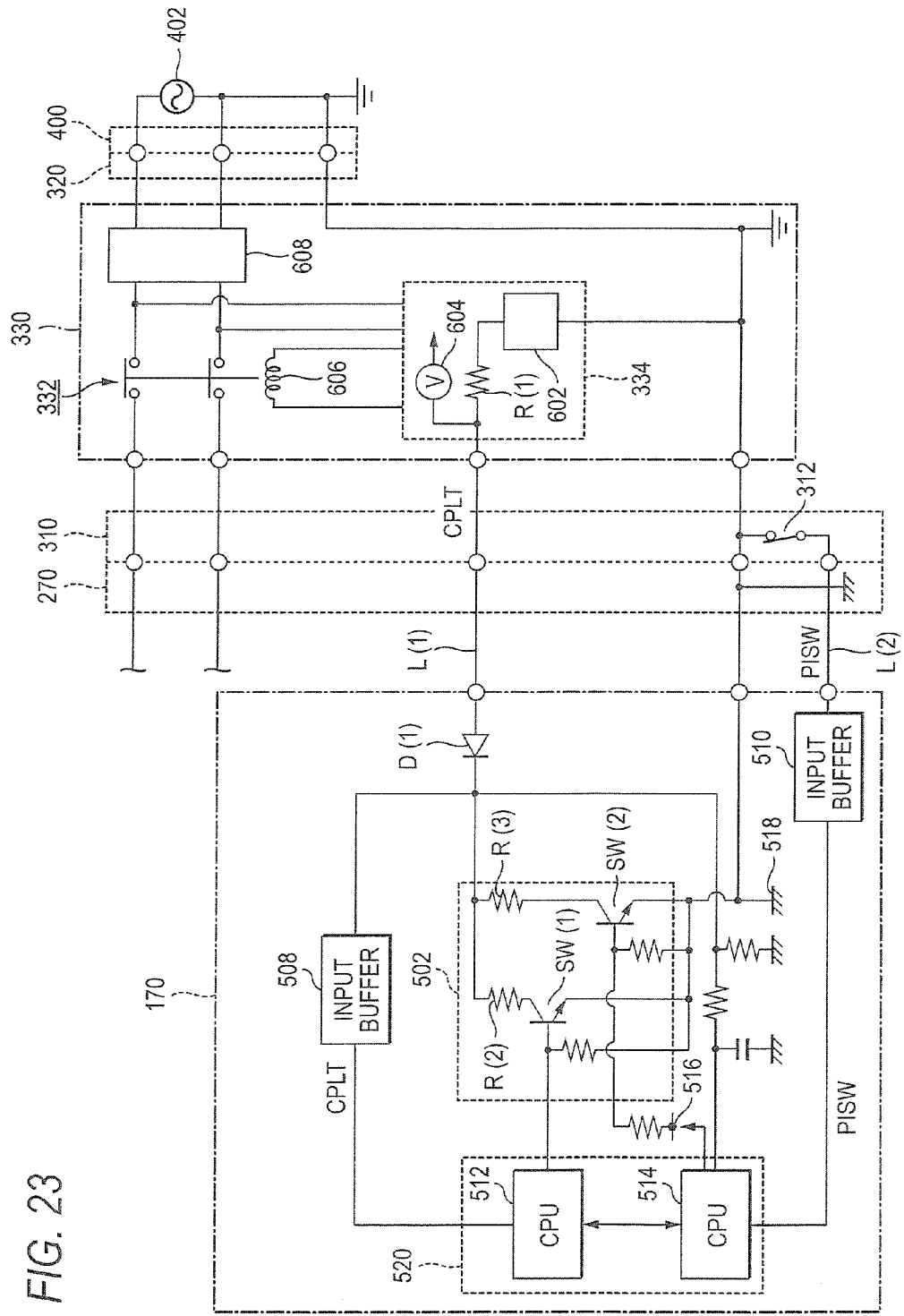
FIG. 23 is a view illustrating the charging system shown in FIG. 22 in more detail.
Figure 24:
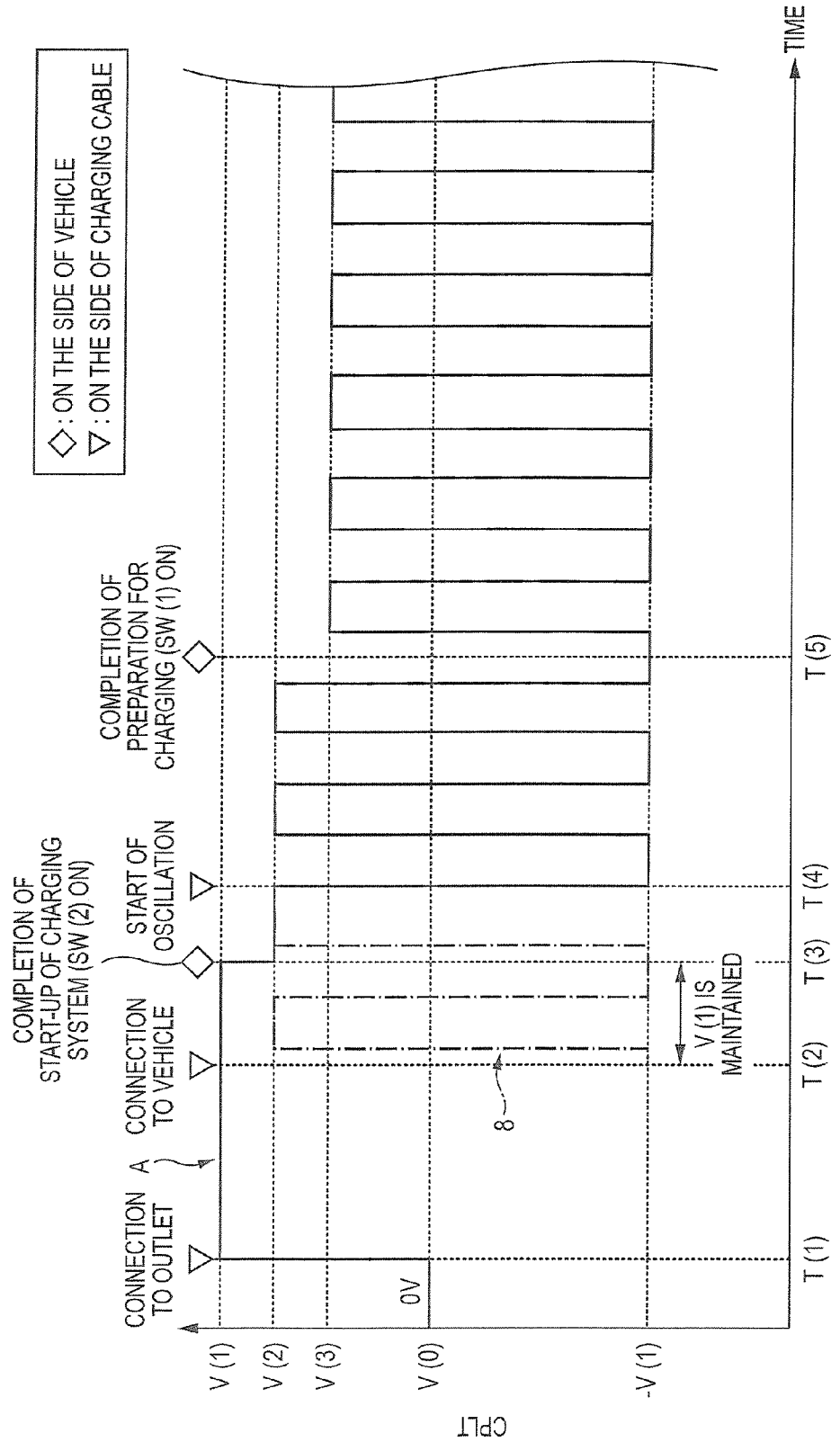
FIG. 24 is an example of a timing chart of the pilot signal CPLT shown in FIGS. 22 and 23.
Figure 25:
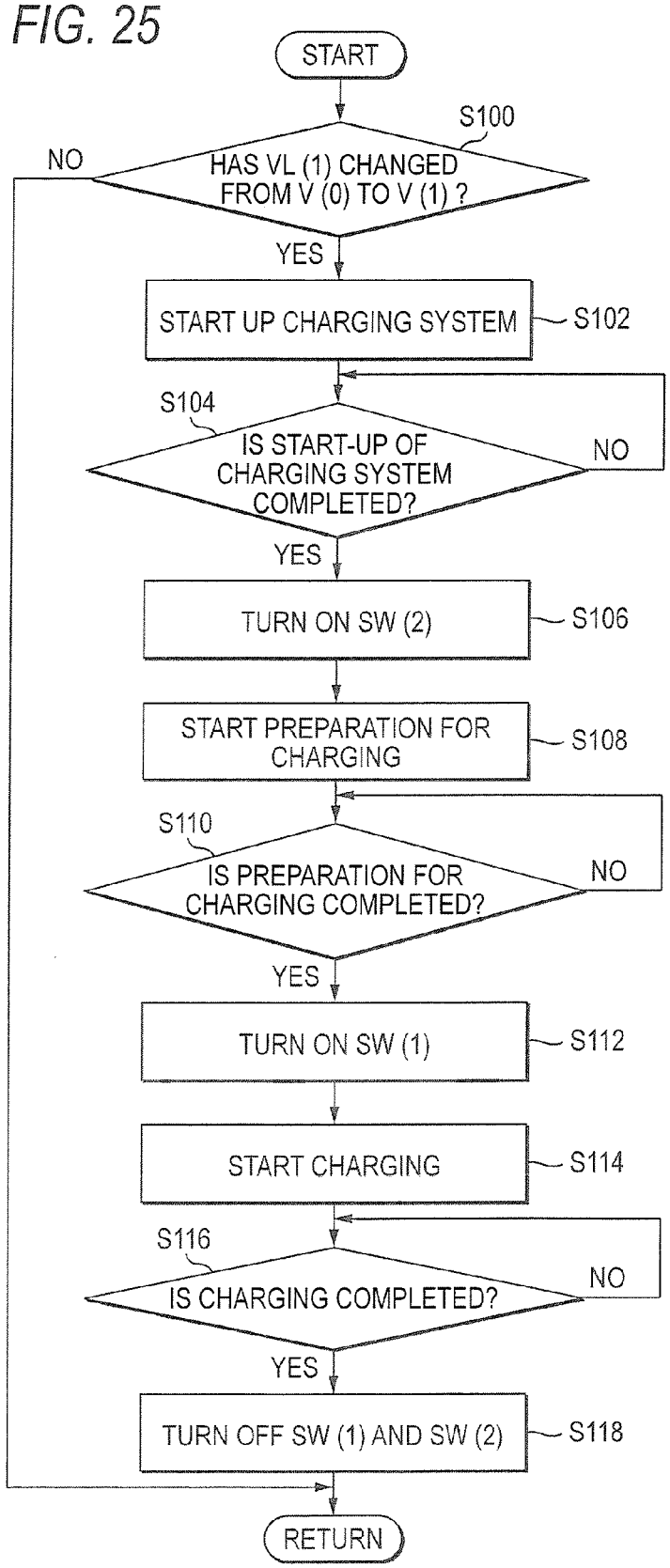
FIG. 25 is a flow chart showing the operation of the CPU 520 in the charging system disclosed in Patent Document 1.

FIG. 21 a timing chart showing the timings of the pilot signal CPL, the activating signal INT, etc. when the control section 45 provided for the charge controller 21 of the vehicle according to the fourth embodiment is activated. The signals respectively indicated by letters a to g shown in FIG. 21 are signals being present on the lines indicated by the same letters shown in FIG. 18.

When the time preset in the control circuit 31 of the external power source apparatus 1 is reached, the control circuit 31 switches the change-over switch 39 to the position for the oscillation circuit 37. As a result, as shown in FIG. 21, the state of the pilot signal CPL (signal a) changes from the non-connection state to the oscillation state. At this time, the counting circuit 81 of the activating section 47 counts the number of pulses of the signal b, that is, the stabilized signal having the constant voltage amplitude obtained when the pilot signal CPL was converted by the buffer circuit 43, and outputs a signal d indicating the number of counts. When the number of counts indicated by the signal d becomes equal to or more than a reference value, the comparator 65 outputs a signal e having a logical state of H (high). Signals and processes to be used hereafter are similar to those according to the second embodiment shown in FIG. 13. After the state of the pilot signal CPL (signal a) has changed from the oscillation state to the non-connection state, the number of counts of the signal d output from the counting circuit 81 decreases, and the signal e output from the comparator 65 has a logical state of L.

As described above, according to this embodiment, when the charging of the high-voltage battery 11 provided for the vehicle is performed by timer reservation having been set in the external power source apparatus 1, the charge controller 21 of the vehicle does not consume the power of the low-voltage battery 13 during the stand-by period. Furthermore, since the counting circuit 81 counts the number of pulses of the pilot signal CPL, the activating section 47 does not require the integrator 63 that is required in the cases of the second embodiment and the third embodiment. Hence, the configuration of the activating section 47 can be simplified.

Although the present invention has been described in detail and referring to the specific embodiments, it is obvious to those skilled in the art that the present invention can be changed and modified variously without departing from the spirit and scope of the present invention.

This application is based on Japanese Patent Application (Patent Application No. 2010-198022) filed on Sep. 3, 2010 and Japanese Patent Application (Patent Application No. 2010-277990) filed on Dec. 14, 2010, the entire contents of which are hereby incorporated by reference.

DESCRIPTION OF REFERENCE NUMERALS AND SIGNS 1 external power source apparatus
2 charging cable
3 charging connector
11 high-voltage battery
13 low-voltage battery
15 AC/DC converter
17 DC/DC converter
19 vehicle main switch
21 charge controller
31 control circuit
33 main switch
35 12 V power source
37 oscillation circuit
39 change-over switch
41 input circuit
43 buffer circuit
45 control section
47 activating section
51 oscillation state judgment section
53 activating signal generation section
61 pulse-width fixed conversion section
63 integrator
65 comparator
67 D-type flip-flop (D-FF)
71 frequency divider circuit
81 counting circuit

The invention claimed is:

1. A charge controller configured to control a charging of a battery provided inside a vehicle using a control signal supplied from an external power source via a power cable,
wherein the external power source apparatus switches the control signal from a non-oscillation state to an oscillation state when a preparation for power supply from the external power source apparatus is completed,
wherein the charge controller includes, inside the vehicle,
a control section which controls the charging of the battery and
an activating section which activates the control section, wherein the control section changes a voltage of the control signal, and
wherein the activating section includes
an oscillation state judgment section which judges whether the control signal input from the external power source apparatus via the power cable is in the oscillation state or the non-oscillation state and outputs an oscillation state judgment signal and
an activating signal generation section which generates an activating signal for activating the control section when the oscillation state judgment signal is switched from a state indicating non-oscillation to a state indicating oscillation.

2. The charge controller of claim 1,
wherein the oscillation state judgment section switches the oscillation state judgment signal from the state indicating non-oscillation to the state indicating oscillation when the number of pulses of the control signal becomes equal to or more than a predetermined value.

3. The charge controller of claim 2,
wherein the oscillation state judgment section includes
a pulse integration section which accumulates the number of pulses of the control signal during a predetermined period and
a comparison section which compares the accumulated number at the pulse integration section with a reference value and switches the oscillation state judgment signal from the state indicating non-oscillation to the state indicating oscillation when the accumulated number becomes equal to or more than the reference value.

4. The charge controller of claim 3,
wherein the oscillation state judgment section includes a pulse-width fixed conversion section which converts the control signal into a periodic signal having a constant pulse width, and
wherein the pulse integration section accumulates the number of pulses of the control signal converted so as to have the constant pulse width by the pulse-width fixed conversion section.

5. The charge controller of claim 3,
wherein the oscillation state judgment section includes a frequency division section which divides a frequency of the control signal, and
wherein the pulse integration section accumulates the number of pulses of the control signal, the frequency of which is divided by the frequency division section.

6. The charge controller of claim 3,
wherein the pulse integration section is formed of a counting circuit which increases a count value when a pulse is input and decreases the count value when the input of the pulse stops.

7. The charge controller of any of claim 1,
wherein the control section outputs a clear signal for stopping the activating signal generation section from generating the activating signal.

8. The charge controller of claim 7,
wherein the activating signal generation section maintains the state in which the generation of the activating signal is stopped even if the oscillation state judgment signal having the state indicating oscillation remains unchanged after the generation of the activating signal is stopped in response to the clear signal.

9. The charge controller of any of claim 1,
wherein the charge controller further includes a buffer circuit section which converts the control signal input from the external power source apparatus into a stabilized signal having a constant voltage amplitude,
wherein the control signal converted by the buffer circuit section into the stabilized signal having the constant voltage amplitude is input to the oscillation state judgment section.

10. A charging system configured to charge a battery provided inside a vehicle with power supplied from an external power source apparatus via a power cable,
wherein the external power source apparatus includes
a signal output section which outputs an oscillation signal or a non-oscillation signal serving as a control signal for activating a charge controller provided inside the vehicle and
a switching control section which switches the control signal from the non-oscillation signal to the oscillation signal when a preparation for power supply is completed,
wherein the charge controller includes
a control section which controls a charging of the battery and
an activating section which activates the control section, wherein the control section changes a voltage of the control signal, and
wherein the activating section includes:
an oscillation state judgment section which judges whether the control signal input from the external power source apparatus via the power cable is in an oscillation state or a non-oscillation state and outputs an oscillation state judgment signal and
an activating signal generation section which generates an activating signal for activating the control section when the oscillation state judgment signal is switched from a state indicating non-oscillation to a state indicating oscillation.

* * * * *